United States Patent
Grohoski et al.

(10) Patent No.: US 7,392,399 B2
(45) Date of Patent: Jun. 24, 2008

(54) METHODS AND SYSTEMS FOR EFFICIENTLY INTEGRATING A CRYPTOGRAPHIC CO-PROCESSOR

(75) Inventors: Gregory F. Grohoski, Austin, TX (US); Paul J. Jordan, Austin, TX (US); Michael K. Wong, San Mateo, CA (US); Leslie D. Kohn, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 803 days.

(21) Appl. No.: 10/430,614

(22) Filed: May 5, 2003

(65) Prior Publication Data

US 2004/0225885 A1  Nov. 11, 2004

(51) Int. Cl.
G06F 11/30 (2006.01)
G06F 12/14 (2006.01)
H04L 9/32 (2006.01)

(52) U.S. Cl. ...................................................... 713/189

(58) Field of Classification Search ........................ None
See application file for complete search history.

(56) References Cited

U.S. PATENT DOCUMENTS

| | | | | |
|---|---|---|---|---|
| 5,018,138 A | * | 5/1991 | Twitty et al. ................. | 370/448 |
| 5,070,446 A | * | 12/1991 | Salem .......................... | 703/21 |
| 5,226,171 A | | 7/1993 | Hall et al. | |
| 5,272,651 A | * | 12/1993 | Bush et al. .................... | 703/16 |
| 5,706,465 A | * | 1/1998 | Kurokawa et al. ........... | 711/123 |
| 5,892,966 A | | 4/1999 | Petrick et al. | |
| 5,978,838 A | | 11/1999 | Mohamed et al. | |
| 6,026,490 A | * | 2/2000 | Johns-Vano et al. ........... | 380/28 |
| 6,088,800 A | * | 7/2000 | Jones et al. ................... | 713/189 |
| 6,209,087 B1 | | 3/2001 | Cashman et al. | |
| 6,209,098 B1 | * | 3/2001 | Davis .......................... | 713/194 |
| 6,292,893 B1 | * | 9/2001 | Micali ......................... | 713/158 |
| 6,334,180 B1 | | 12/2001 | Petrick | |
| 6,378,072 B1 | * | 4/2002 | Collins et al. ................ | 713/187 |
| 6,408,075 B1 | * | 6/2002 | Ohki et al. .................... | 380/28 |
| 6,424,987 B1 | | 7/2002 | Romain | |

(Continued)

FOREIGN PATENT DOCUMENTS

WO  WO 00/76119  12/2000

(Continued)

OTHER PUBLICATIONS

Applied Cryptography by Bruce Schneier, Second Edition—1996—pp. 270-277.*

(Continued)

Primary Examiner—Ayaz Sheikh
Assistant Examiner—Arezoo Sherkat
(74) Attorney, Agent, or Firm—Martine Penilla & Gencarella, LLP

(57) ABSTRACT

A method and system of processing a cryptographic packet includes receiving a first cryptographic packet in a host CPU. A first set of data required to execute the first cryptographic packet is identified. The first cryptographic packet and the required first set of data is transferred to a cryptographic co-processor. The first cryptographic packet is executed in the cryptographic co-processor. The host CPU is notified that the execution of the first cryptographic packet is complete. The executed first cryptographic packet is received in the host CPU.

19 Claims, 10 Drawing Sheets

U.S. PATENT DOCUMENTS

| | | | |
|---|---|---|---|
| 6,477,646 B1* | 11/2002 | Krishna et al. | 713/189 |
| 6,578,061 B1* | 6/2003 | Aoki et al. | 708/520 |
| 6,681,341 B1* | 1/2004 | Fredenburg et al. | 714/30 |
| 6,754,223 B1* | 6/2004 | Lussier et al. | 370/412 |
| 6,804,239 B1* | 10/2004 | Lussier et al. | 370/392 |
| 6,822,959 B2* | 11/2004 | Galbi et al. | 370/392 |
| 6,963,977 B2 | 11/2005 | Chen et al. | |
| 6,968,453 B2 | 11/2005 | Doyle et al. | |
| 2001/0052070 A1 | 12/2001 | Oishi et al. | |
| 2002/0006202 A1* | 1/2002 | Fruehauf et al. | 380/260 |
| 2002/0027988 A1 | 3/2002 | Callum | |
| 2002/0091826 A1* | 7/2002 | Comeau et al. | 709/226 |
| 2002/0108048 A1* | 8/2002 | Qi et al. | 713/189 |
| 2002/0191793 A1* | 12/2002 | Anand et al. | 380/255 |
| 2003/0014627 A1* | 1/2003 | Krishna et al. | 713/153 |
| 2003/0084309 A1* | 5/2003 | Kohn | 713/189 |
| 2004/0039928 A1* | 2/2004 | Elbe et al. | 713/189 |
| 2004/0230813 A1* | 11/2004 | Check et al. | 713/189 |

FOREIGN PATENT DOCUMENTS

| | | |
|---|---|---|
| WO | WO 01/86430 | 11/2001 |
| WO | WO 02/48857 A2 * | 6/2002 |

OTHER PUBLICATIONS http://en.wikipedia.org/wiki/Advanced_Encryption_Standard.*
http:llen.wikipedia.
orglwikilAdvanced_Encryption_Standard—(Dec. 3, 2007).*

* cited by examiner

| Operation | Dir | SoB (1) | EoB (0) | Reserved (0000) | Int | Core ID | Authenticatio n Type | Encrypt Type | HW Status | Length |
|---|---|---|---|---|---|---|---|---|---|---|
| 0      7 | 8 | 9 | 10 | 11         14 | 15 | 16    23 | 24       31 | 32    39 | 40    47 | 48        63 |
| Authentication Key Address ||||||||||| 
| 64                                                                                                                                                                127 |||||||||||
| Authentication IV Address |||||||||||
| 128                                                                                                                                                               191 |||||||||||
| Final Authentication State Address |||||||||||
| 192                                                                                                                                                               255 |||||||||||
| Encryption Key Address |||||||||||
| 256                                                                                                                                                               319 |||||||||||
| Encryption Initialization Vector Address |||||||||||
| 320                                                                                                                                                               383 |||||||||||
| Source Address |||||||||||
| 384                                                                                                                                                               447 |||||||||||
| Reserved ||||||| | Hash Length | $2^{nd}$ operation offset ||
| 448                                                                                          487 | 488     495 | 496                   511 ||||||||| 
| Reserved ||||||||| | $2^{nd}$ operation length |
| 512                                                                                                                                    559 | 560            577 ||||||||||
| Destination Address |||||||||||
| 578                                                                                                                                                               639 |||||||||||

Figure 5

| Reserved (000000000000000000000000000000000000000) ||| Length | Reserved (00000000) |
|---|---|---|---|---|
| 0 ||                                                                                   39 | 40     55 | 56        63 |
| Source Address |||||
| 64 ||||                                                                                                                  127 |

Figure 6

| Reserved (0000000000) | EoB (1) | Reserved (00000000000000000000000000000) | Length | Reserved (00000000) |
|---|---|---|---|---|
| 0            9 | 10 | 11                                                                 39 | 40    55 | 56        63 |
| Source Address |||||
| 64 |||| 127 |

Figure 7

| Control Register 0 | |
|---|---|
| 0 | 63 |
| Control Register 1 | |
| 0 | 63 |
| Source Data DW0 | |
| 0 | 63 |
| Source Data DW1 | |
| 0 | 63 |
| Source Data DW2 | |
| 0 | 63 |
| Source Data DW3 | |
| 0 | 63 |
| Source Data DW4 | |
| 0 | 63 |
| Source Data DW5 | |
| 0 | 63 |
| Source Data DW6 | |
| 0 | 63 |
| Source Data DW7 | |
| 0 | 63 |
| Cipher Key Data DW0 | |
| 0 | 63 |
| Cipher Key Data DW1 | |
| 0 | 63 |
| Cipher Key Data DW2 | |
| 0 | 63 |
| Cipher Key Data DW3 | |
| 0 | 63 |
| Cipher Initialization Vector DW0 | |
| 0 | 63 |
| Cipher Initialization Vector DW1 | |
| 0 | 63 |
| Authentication Key DW0 | |
| 0 | 63 |
| Authentication Key DW1 | |
| 0 | 63 |
| Authentication Key DW2 | |
| 0 | 63 |
| Authentication Key DW3 | |
| 0 | 63 |
| Cipher Result DW0 | |
| 0 | 63 |
| Cipher Result DW1 | |
| 0 | 63 |
| Cipher Result DW2 | |
| 0 | 63 |
| Cipher Result DW3 | |
| 0 | 63 |
| Cipher Result DW4 | |
| 0 | 63 |
| Cipher Result DW5 | |
| 0 | 63 |
| Cipher Result DW6 | |
| 0 | 63 |
| Cipher Result DW7 | |
| 0 | 63 |
| Hash Initialization Vector / Hash Result DW0 | |
| 0 | 63 |
| Hash Initialization Vector / Hash Result DW1 | |
| 0 | 63 |
| Hash Initialization Vector / Hash Result DW2 | |
| 0 | 63 |
| Hash Initialization Vector / Hash Result DW3 | |
| 0 | 63 |

Figure 8A

| Enabled | Reserved | |
|---|---|---|
| 0 | 1 | 63 |

Figure 8B

| Operation | Dir | Reserved (000) | EnOffset | HaOffset | Authentication Type | Encrypt Type | HW Status | Reserved | EnLength | HaLength |
|---|---|---|---|---|---|---|---|---|---|---|
| 0  7 | 8 9 | 11 | 12  17 | 18  23 | 24  31 | 32  39 | 40  47 | 48  51 | 52  57 | 58  63 |

Figure 8C

| RC4 State Register 1 | |
|---|---|
| 0 | 63 |
| RC4 State Register 2 | |
| 0 | 63 |
| RC4 State Register 3 | |
| 0 | 63 |

●
●
●

| RC4 State Register 28 | | |
|---|---|---|
| 0 | | 63 |
| RC4 State Register 29 | | |
| 0 | | 63 |
| RC4 State Register 30 | | |
| 0 | | 63 |
| RC4 State Register 31 | | |
| 0 | | 63 |
| Reserved | RC4 Y-index | RC4 X-index |
| 0  47 | 48  55 | 56  63 |

Figure 9

| IP header (typically 20 bytes) | AH (24 bytes) | TCP header (typically 20 bytes) | Data N bytes |
|---|---|---|---|

Figure 11A

| New IP header (typically 20 bytes) | AH (24 bytes) | Original IP header (typically 20 bytes) | TCP header (typically 20 bytes) | Data N bytes |
|---|---|---|---|---|

Figure 11B

| IP header Typically 20 bytes | ESP header 8 bytes | TCP header Typically 20 bytes | Data N bytes | ESP trailer 2 – 257 bytes | ESP authentication 12 bytes |
|---|---|---|---|---|---|

Figure 11C

| *Security Parameter Index (SPI)* 32 bits |  |
|---|---|
| *Sequence Number* 32 bits |  |
| *Data* N bytes |  |
| *Padding* 0 – 255 bytes |  |
| *Pad Length* 8 | *Next Header* 8 |
| *Authentication Data Word 1* 32 |  |
| *Authentication Data Word 2* 32 |  |
| *Authentication Data Word 3* 32 |  |

Figure 11D

| New IP header Typically 20 bytes | ESP header 8 bytes | Old IP header Typically 20 bytes | TCP header Typically 20 bytes | Data N bytes | ESP trailer 2 – 257 bytes | ESP authentication 12 bytes |
|---|---|---|---|---|---|---|

Figure 12

| IP header | AH | ESP header | TCP header | Data | ESP trailer |
|---|---|---|---|---|---|
| Typically 20 bytes | (24 bytes) | 8 bytes | Typically 20 bytes | N bytes | 2 – 257 bytes |

Figure 13

| Type | Major | Minor | Length | Cleartext |
|---|---|---|---|---|
| 8 | 8 | 8 | 16 | <= 16KB |

Figure 14

| Type | Major | Minor | Length | Ciphertext |
|---|---|---|---|---|
| 8 | 8 | 8 | 16 | <= 18KB |

Figure 15

| Type | Major | Minor | Length | Data (encrypted) | MAC (encrypted) | Padding (encrypted, optional for block cipher) | Pad length (optional, required if padding present) |
|---|---|---|---|---|---|---|---|
| 8 | 8 | 8 | 16 | <= 16KB | 0, 16, or 20B | 0 to 255 B | 8 |

Figure 16

METHODS AND SYSTEMS FOR EFFICIENTLY INTEGRATING A CRYPTOGRAPHIC CO-PROCESSOR

CROSS REFERENCE TO RELATED APPLICATIONS

This application is related to commonly owned U.S. patent application Ser. No. 10/273,718 filed on Oct. 18, 2002 and entitled "Stream Processor with Cryptographic Co-Processor," which is incorporated herein by reference in its entirety.

BACKGROUND OF THE INVENTION

1. Field of the Invention

The present invention relates generally to microprocessors, and more particularly, to systems and methods for a microprocessor to efficiently integrate operations with an on-die co-processor.

2. Description of the Related Art

Microprocessors can often include both a central processing unit (CPU) and a specialty co-processor on one die. The specialty co-processor can perform any type of operation to assist the CPU to rapidly process the required data. FIG. 1A shows an exemplary microprocessor die 100 that includes a CPU 110 and a co-processor 120. The co-processor 120 can be a cryptographic co-processor. The cryptographic processor 120 can be included on the same die 100 as the CPU 110 because a cryptographic operation is a relatively complex and time-consuming process. Therefore having the cryptographic co-processor 120 on the same die 100 with the CPU 110 can allow for faster cryptographic operations as compared to having the cryptographic co-processor external to (e.g., peripheral) the CPU die 100.

FIG. 1B is a flowchart of the method operations 140 for the typical CPU 110 and cryptographic co-processor 120 to process a cryptographic operation request. FIG. 1C is a graphical representation of a time line 180 for processing the same cryptographic operation request. In operation 142, the CPU 110 receives an operation request such as a data packet. In operation 144, the CPU 110 identifies the received request as a crypto operation request. By way of example an IPsec encrypted packet can be received in the CPU 110. Software in the CPU can identify the packet as an IPsec encrypted packet. In operation 146, the CPU sends the IPsec packet to the crypto co-processor 120 to be processed.

Referring now to both FIGS. 1B and 1C, operations 142-144 occur between time $T_0$ and time $T_1$, operation 146 occurs at time $T_1$. Between times $T_0$ and $T_1$, the crypto co-processor 120 is sitting idle (i.e., stalled) waiting for a crypto operation request to be transferred to the crypto co-processor. At time $T_1$, in operation 146, once the crypto operation request is transferred to the crypto co-processor 120, the CPU retrieves and begins processing a subsequent operation request or requests in operation 148.

Between time $T_1$ and time $T_2$, the crypto co-processor 120 processes the crypto operation request such as in operations 150-152. In operation 150, the crypto co-processor 120 identifies the data required to execute the crypto operation. By way of example, a required decryption key may be identified. Unfortunately, the crypto co-processor 120 cannot access the required decryption key because it does not know where the key is located. Further, the crypto co-processor 120 cannot directly access the memory. In operation 152, at time $T_2$, the crypto co-processor 120 sends a request for the identified data to the CPU 110. The crypto co-processor 120 then stalls because processing the single crypto operation request cannot continue until the required decryption key is received by the crypto co-processor.

In operation 154, the CPU 110 interrupts the operation request then currently being processed. Alternatively, the CPU 110 can wait until the then current operation request is completed. In operation 156, the CPU 110 retrieves the identified data (e.g., the decryption key). In operation 158, the CPU 110 provides the identified data to the crypto co-processor 120. Once the identified data is provided to the crypto co-processor 120, the CPU 110 can resume the interrupted operation request or alternatively retrieve a subsequent operation request. If the subsequent operation request is identified as another crypto operation request, the CPU 110 may stall waiting for the crypto co-processor to be available to execute the subsequent crypto operation request.

At time $T_3$, in operations 160 and 162, the crypto co-processor 120 resumes processing the crypto operation request and completes the crypto operation request. By way of example, the crypto co-processor can decrypt the crypto operation request to produce a decryption result.

In operation 164, at time $T_4$, the crypto co-processor 120 notifies the CPU 110 that the current crypto operation request has been completed. The crypto co-processor 120 then stalls until the CPU 110 requests the result of the completed crypto operation request. In operation 166, the CPU 110 interrupts (or alternatively completes) the then current operation request before responding to the completed notice from the crypto co-processor 120 at time $T_5$.

Operations continue in similar theme as subsequent crypto operation requests are received in the CPU 110 and passed to the crypto co-processor 120 for execution. The above-described method operations 142-166 are very inefficient because the crypto co-processor 120 is often stalled waiting for the necessary data to complete a crypto operation request. Further, the constant interruptions of the CPU 110 by the crypto co-processor 120 reduce the efficiency of processing in the CPU. Further still, if the CPU 110 retrieves multiple crypto operation requests in short succession (e.g., before the crypto co-processor 120 has completed the previous crypto operation request), the CPU may stall waiting for the crypto co-processor to become available to execute a subsequent crypto operation request.

In the past, these shortcomings have been addressed in numerous approaches. One approach has been to increase the speed (i.e., frequency) of the data bus (e.g., bandwidth) between the CPU 110 and the crypto co-processor 120. Including both the CPU and crypto co-processor to the same die 100 has also reduced some delay times and increased throughput somewhat. Another approach has been to simply drive the processing speed (e.g., clock speed) of the CPU and crypto co-processor ever faster. However, while each of these approaches failed to address the fundamental problem of an inefficient system and method of communication between the CPU 110 and the crypto co-processor 120. In view of the foregoing, there is a need for a system and method to provide improved communication efficiency between the CPU 110 and the crypto co-processor 120.

SUMMARY OF THE INVENTION

Broadly speaking, the present invention fills these needs by providing an improved system and method to provide improved communication efficiency between the CPU and the crypto co-processor. It should be appreciated that the present invention can be implemented in numerous ways, including as a process, an apparatus, a system, computer readable media, or a device. Several inventive embodiments of the present invention are described below.

One embodiment includes a method processing a cryptographic packet includes receiving a first cryptographic packet in a host CPU. A first set of data required to execute the first cryptographic packet is identified. The first cryptographic packet and the required first set of data are transferred to a cryptographic co-processor. The first cryptographic packet is executed in the cryptographic co-processor. The host CPU is notified that the execution of the first cryptographic packet is complete. The executed first cryptographic packet is received in the host CPU.

Identifying the first set of data required to execute the first cryptographic packet can also include identifying the required first set of data in a first control word. The control word can include instructions for the crypto co-processor.

Transferring the first cryptographic packet and the required first set of data to the cryptographic co-processor can include transferring the first cryptographic packet and the required first set of data through a control queue. Identifying the first set of data required to execute the first cryptographic packet can include identifying the required first set of data in a first control word. The first control word can be located in the control queue. The first control word can also identify a first storage location of the first cryptographic packet and a second storage location of the required first set of data.

Notifying the host CPU that the execution of the first cryptographic packet is complete can include modifying a field in the first control word. Modifying the field in the first control word can include identifying a third location of an execution result of the executed first cryptographic packet. Receiving the executed first cryptographic packet in the host CPU can also include the host CPU retrieving the execution result from the third location identified by the first control word.

Transferring the first cryptographic packet and the required first set of data to the cryptographic co-processor can include receiving a subsequent packet in the host CPU and executing the subsequent packet in the host CPU. If the subsequent packet is a second cryptographic packet, then executing the subsequent crypto packet in the host CPU can include identifying a second set of data required to execute the second cryptographic packet, transferring the second cryptographic packet and the required second set of data to the cryptographic co-processor, executing the second cryptographic packet in the cryptographic co-processor, notifying the host CPU that the execution of the second cryptographic packet is complete, and receiving the executed second cryptographic packet in the host CPU.

The second cryptographic packet can be executed in the cryptographic co-processor substantially in parallel with executing the first cryptographic packet. The second cryptographic packet can be executed in the cryptographic co-processor in series with executing the first cryptographic packet.

If the subsequent packet is a second cryptographic packet, then executing the subsequent packet in the host CPU can include identifying a second set of data required to execute the second cryptographic packet, transferring the second cryptographic packet and the required second set of data to the cryptographic co-processor via an interface, executing the second cryptographic packet in the cryptographic co-processor substantially in parallel with executing the first cryptographic packet, notifying the host CPU that the execution of the second cryptographic packet is complete, and receiving the executed second cryptographic packet in the host CPU.

Another embodiment includes a microprocessor that includes a host CPU, a cryptographic co-processor, and a control queue coupled to the host CPU and the cryptographic co-processor. The cryptographic co-processor can include multiple hardware units and at least one software component. The multiple hardware units can include one or more crypto units that are optimized to perform a selected encryption process.

The control queue can be a storage location in the microprocessor. An interface coupled between the host CPU and the cryptographic co-processor can also be included. The interface is capable of transferring an instruction from the host CPU to the cryptographic co-processor. The interface can be a set of hardware registers.

Another embodiment includes a method of processing a cryptographic packet. The method includes receiving a first cryptographic packet in a host CPU. A first set of data required to execute the first cryptographic packet is identified in a first control word. The first control word being located in a control queue and includes identifying a first storage location of the first cryptographic packet and identifying a second storage location of the required first set of data. The first cryptographic packet and the required first set of data are transferred to a cryptographic co-processor. The first cryptographic packet is executed in the cryptographic co-processor. A field in the first control word is modified to notify the host CPU that the execution of the first cryptographic packet is complete. The modification of the first control word can include identifying a third location of an execution result of the executed first cryptographic packet. The host CPU retrieves the execution result from the third location identified by the first control word.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

FIG. 5 is a graphical representation of an initial control word that may be stored in the control queue, in accordance with one embodiment of the present invention.

FIG. 6 shows an extension control word in accordance with one embodiment of the present invention.

FIG. 7 shows a final control word in accordance with one embodiment of the present invention.

FIG. 8A shows a set of non-RC4 registers in accordance with one embodiment of the present invention.

FIG. 8B shows a format of Control Register 0 in accordance with one embodiment of the present invention.

FIG. 8C shows an exemplary format of control register 1 in accordance with one embodiment of the present invention.

FIG. 9 shows the RC4 state registers according to one embodiment of the present invention.

FIG. 11A shows an exemplary format of an IPsec packet encapsulating a TCP datagram for transport mode AH, in accordance with one embodiment of the present invention.

FIG. 11B shows an exemplary format of an IPsec packet encapsulating a TCP datagram for tunnel mode AH, in accordance with one embodiment of the present invention.

FIG. 11C shows an exemplary general packet format for transport mode ESP, in accordance with one embodiment of the present invention.

FIG. 11D shows a more detailed view of the packet format starting at the ESP header in accordance with one embodiment of the present invention.

FIG. 12 shows a general packet format for a tunnel mode ESP, according to one embodiment of the present invention.

FIG. 13 shows an exemplary packet format of a transport mode bundle in accordance with one embodiment of the present invention.

FIG. 14 shows an exemplary packet (record) format before SSL/TLS in accordance with one embodiment of the present invention.

FIG. 15 shows an exemplary encrypted packet format for SSL/TLS in accordance with one embodiment of the present invention.

FIG. 16 shows an exemplary encrypted packet format with the final byte defining the length of the padded data, in accordance with one embodiment of the present invention.

DETAILED DESCRIPTION OF THE EXEMPLARY EMBODIMENTS

Several exemplary embodiments for an improved system and method to provide improved communication efficiency between the CPU and the crypto co-processor will now be described. It will be apparent to those skilled in the art that the present invention may be practiced without some or all of the specific details set forth herein.

One embodiment of an improved communication method between a CPU and a crypto co-processor on the same die includes the CPU providing all of the information required by the crypto co-processor to fully execute a crypto operation request when the CPU sends the crypto operation request to the crypto co-processor. In this manner, the crypto co-processor can efficiently execute the crypto operation request with minimum stalls and with a minimal number of communication exchanges between the CPU and the crypto co-processor.

Figure 1A:
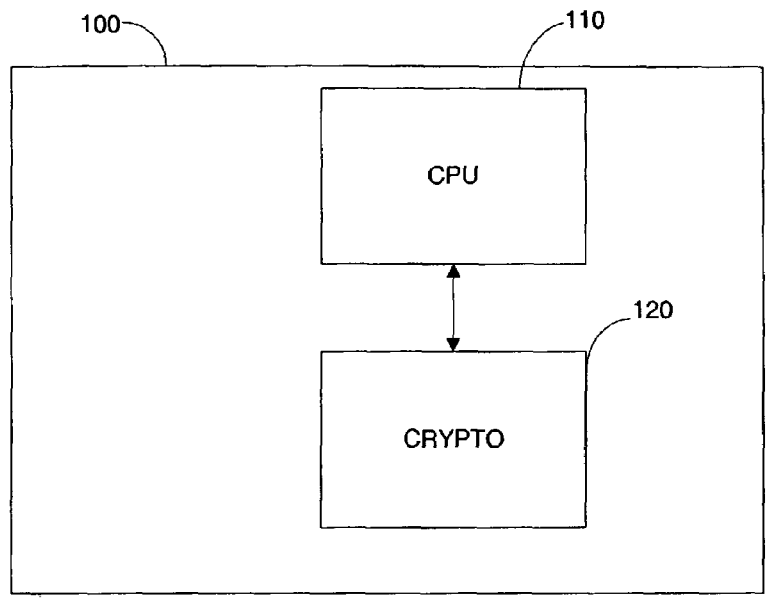
FIG. 1A shows an exemplary microprocessor die that includes a CPU and a co-processor.
Figure 1C:
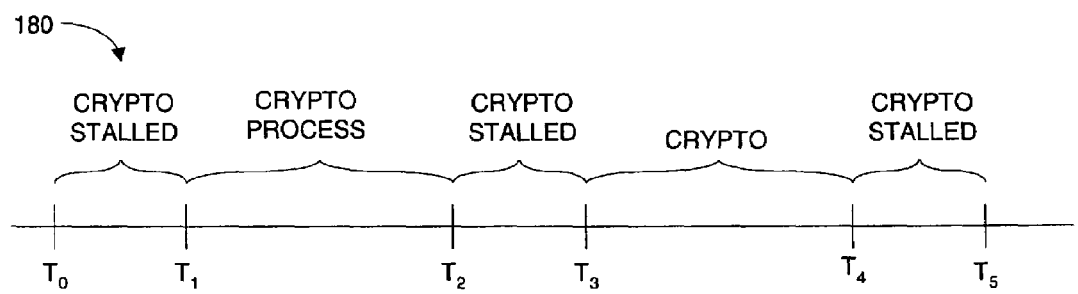
FIG. 1C is a graphical representation of a time line for processing the same cryptographic operation request.
Figure 1B:
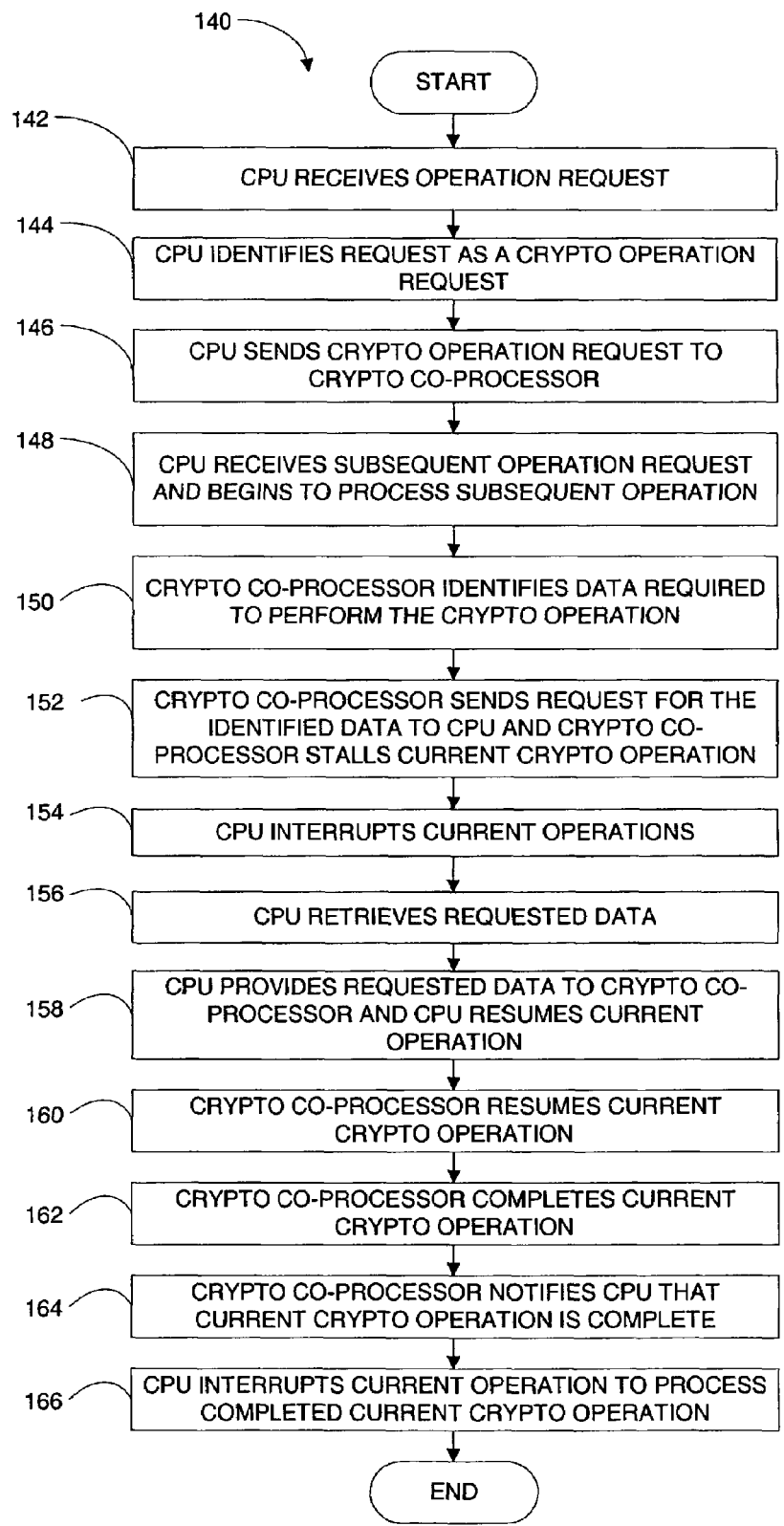
FIG. 1B is a flowchart of the method operations for the typical CPU and cryptographic co-processor to process a cryptographic operation request.
Figure 2:
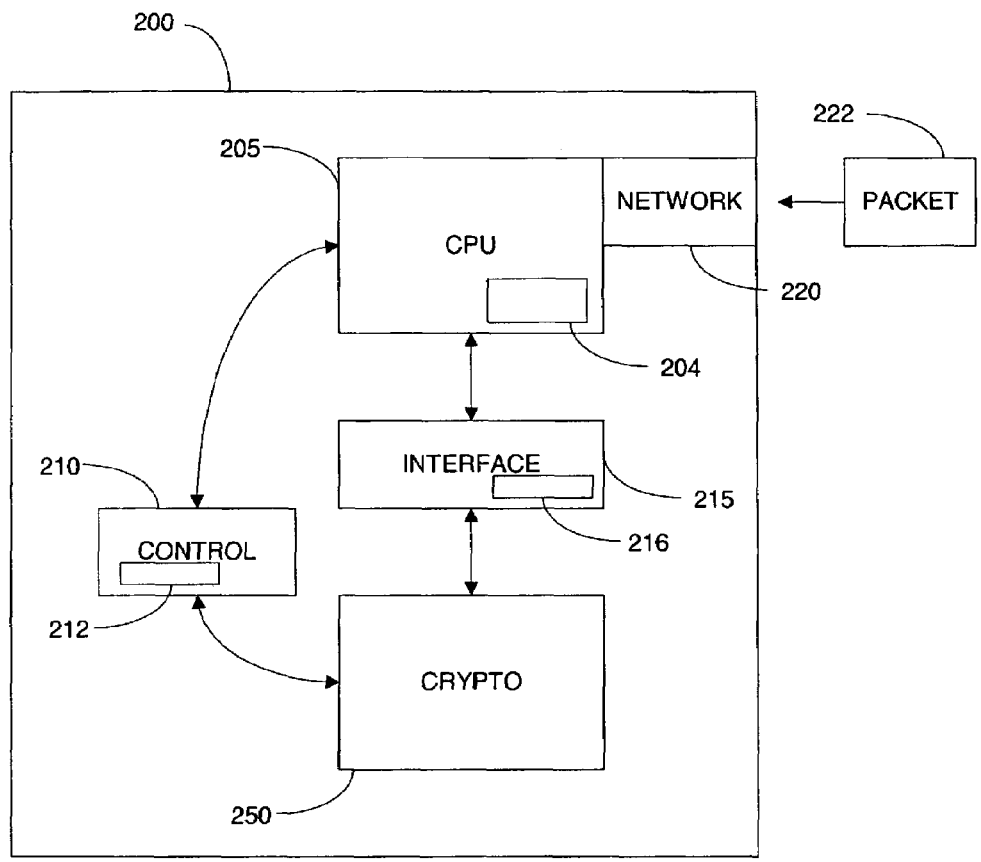
FIG. 2 is a block diagram of a microprocessor die in accordance with one embodiment of the present invention.

FIG. 2 is a block diagram of a microprocessor die 200 in accordance with one embodiment of the present invention. The die 200 includes a CPU 205 and a crypto coprocessor 250. An interface 215 couples the CPU 205 and the crypto coprocessor 250. A control queue 210 is also included for providing control information between the CPU 205 and the crypto coprocessor 250.

The CPU can also be coupled to a network interface 220. The network interface 220 provides data communication between the microprocessor 200 and other computer systems coupled to the microprocessor 200. Hence, network interface 220 may be any device suitable for or enabling the microprocessor 200 to communicate data with a remote processing system (e.g., a client computer) over a data communication link, such as a conventional telephone modem, an Integrated Services Digital Network (ISDN) adapter, a Digital Subscriber Line (DSL) adapter, a cable modem, a satellite transceiver, an Ethernet adapter, or the like.

A data packet 222 is shown being received in the network interface 220. The network interface can be an Ethernet or any other type of network interface. The network interface 220 and/or the CPU 205 can include software 204 that determine whether an incoming packet 222 is an encrypted packet (e.g., IPsec, SSL, TLS, etc.) or a non-encrypted packet.

The control queue 210 can be any storage location that is known (e.g., stored within) and accessible by both the CPU 205 and the crypto coprocessor 250. The control queue 210 can be any memory location accessible to both the CPU 205 and the crypto co-processor 250.

Crypto co-processor 250 can enable higher speed encryption and decryption processes sufficient to support a data transfer speed of up to about 4 Gb/sec or higher in SSL and IPsec. The crypto co-processor 250 also allows crypto processing to overlap with execution of normal (i.e., non-cryptographic) instructions. The crypto co-processor 250 can be accessed through a set of hardware registers. In one embodiment, the crypto co-processor can share arithmetic units (e.g., integer multiplier unit, etc.) and memory access units with the main CPU so as to reduce duplicated hardware on the microprocessor die 200. Sharing the memory access units also can allow the crypto co-processor to directly access the memory system rather than rely of the host CPU to provide that access. The crypto co-processor 250 can also support encrypted data streams such as DES/3-DES/RC-4/SHA-1/MD-5 at 3-6 clocks/byte/core. The crypto co-processor 250 can also support public key (e.g., RSA, integer ECC) crypto functions. The crypto co-processor 250 can also support processor intensive functions such as Montgomery multiply, exponentiation, and reduction, thereby freeing CPU resources for other purposes.

The crypto co-processor 250 and CPU 205 can also share various hardware components (e.g., memory access, arithmetic unit, integer multiplier unit, etc.) as described in commonly owned U.S. patent application Ser. No. 10/273,718 filed on Oct. 18, 2002 and entitled "Stream Processor with Cryptographic Co-Processor" by Kohn, which is incorporated by reference herein, in its entirety.

Figure 4:
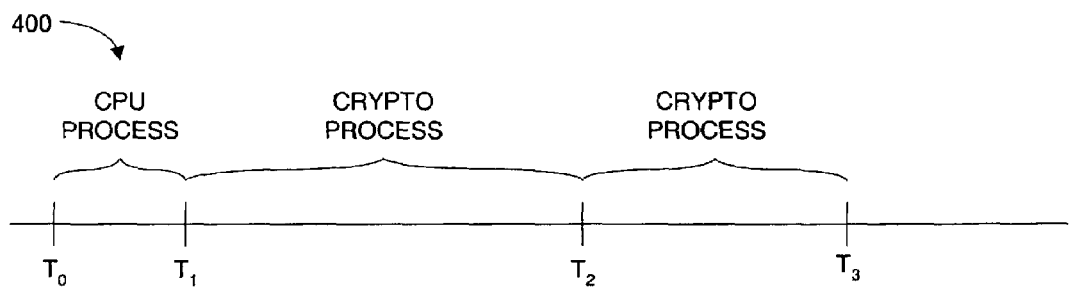
FIG. 4 is graphical representation of a time line for processing the same cryptographic packet.
Figure 3:
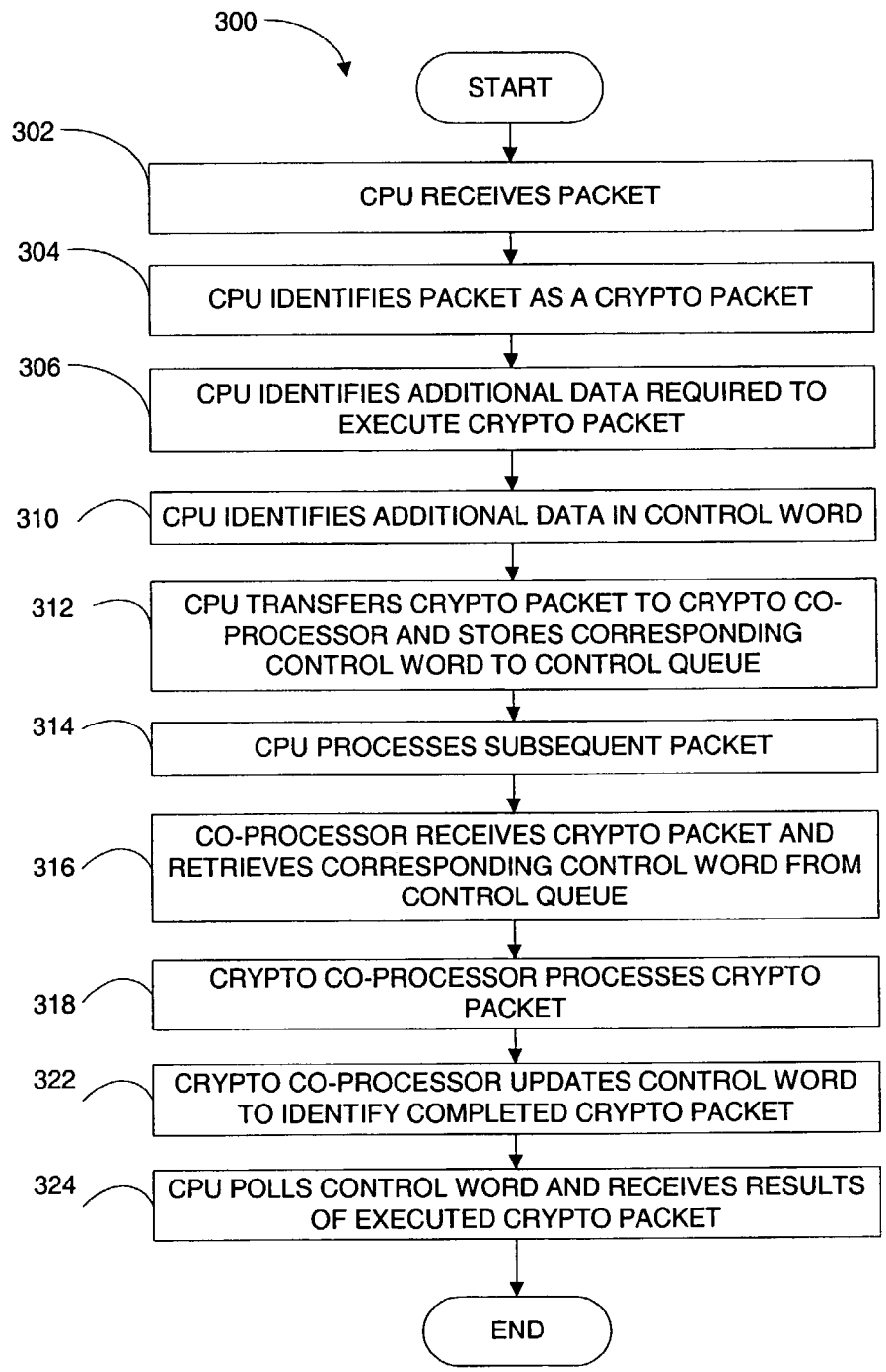
FIG. 3 is a flowchart of the method operations of the CPU and cryptographic co-processor to process a crypto packet, in accordance with one embodiment of the present invention.

FIG. 3 is a flowchart of the method operations 300 of the CPU 205 and cryptographic co-processor 250 to process a crypto packet, in accordance with one embodiment of the present invention. FIG. 4 is graphical representation of a time line 400 for processing the same cryptographic packet. Referring to both FIGS. 3 and 4, at time $T_0$, and in operation 302, the CPU 205 receives a packet. In operation 304, the CPU 205 identifies the packet as a crypto packet (e.g., IPsec, SSL, TLS, etc.).

In operation 306, the CPU 205 identifies any additional data required to execute the crypto packet. The additional data can include an encryption or decryption key, and data to be encrypted or decrypted or other data required to complete the execution of the crypto packet.

In operation 310, the CPU 205 identifies the additional data in the control queue 210. The additional data can be identified in a control word 212 as will be described in more detail below.

In operation 312, the CPU 205 transfers the crypto packet 222 to the crypto co-processor 250 and stores corresponding control word 212 to control queue 210. Transferring the crypto packet 222 to the crypto co-processor 250 can include identifying a storage location of the crypto packet 222 in the control word 212. In operation 314, the CPU receives and begins processing a subsequent packet.

At time $T_1$ and in operation 316, the crypto co-processor 250 receives the crypto packet 222 and retrieves the corresponding control word 212 from control queue 210. In operation 318, the crypto co-processor 250 processes the crypto packet 222. In processing the crypto packet 222 the crypto co-processor 250 uses the required additional data identified in the control word 212. At time $T_2$ and in operation 322, the crypto co-processor 250 updates the control word to identify the crypto packet as being completed. Updating the control word 212 can include identifying a storage location of the execution result of the executed crypto packet 222. Alternatively, the Cpu can identify the location of the execution result of the executed crypto packet 222 in the control word 212 before the control word is transferred to the crypto co-processor 250.

If, between time $T_1$ and time $T_2$, a subsequent packet is processed in the CPU 205 and the subsequent packet is also a crypto packet, then the CPU can identify the required additional data for the subsequent crypto packet and forward the subsequent crypto packet to the crypto co-processor and also forward a corresponding subsequent control word to the control queue 210. In this manner, a subsequent crypto packet will not stall the CPU 205 until the crypto co-processor 250 is available. Further, if such a subsequent crypto packet is forwarded by the CPU 205 while the crypto co-processor 250 is busy processing crypto packet 222, then in operation 322, the crypto co-processor can retrieve the corresponding subsequent control word to immediately process the subsequent crypto packet upon completion of the previous crypto packet.

In operation 324, the CPU 205 polls or otherwise reviews the control word 212. The CPU 205 can periodically check the control word. Alternatively, updating the control word in operation 322 can send an interrupt to the CPU to notify the CPU to check the control word. When the CPU 205 checks the control word 212 and the control word has been updated in operation 322 above, then the CPU can retrieve the results of executed crypto packet 222. The method operations 300 can then end for the packet 222.

The crypto co-processor 250 and CPU 205 communicate primarily through the control word queue 210. Logically, the control word queue 210 is a circular, FIFO (first in first out) queue of commands from software to the crypto co-processor 250, and a circular, FIFO queue of status reports from the crypto co-processor 250 back to CPU 205. Complex commands may require multiple control words. The control word format can also provide a mechanism to group multiple control words into control word blocks for complex commands.

The control word queue 210 is implemented in a region in cacheable memory. CPU 205 allocates a region in memory for the control word queue 210. The crypto co-processor 250 and CPU can also use a multiple register interface to manage the control word queue 210. In one embodiment, four hardware registers are used and can be identified as the First, Last, Head, and Tail registers. The First register holds the address of the first (lowest) control word queue entry. Similarly, the Last register holds the address of the last (highest) control word queue entry. The Head register holds the address of the next control word block for the crypto co-processor 250 to process. The Tail register holds the address of the next control word to be written by software. CPU 205 wraps the Head pointer and software wraps the Tail pointer to First when either pointer passes Last. The queue is full if Head−Tail=1 or if Head=First and Tail=Last; only Last-First entries can be in use at a time.

At reset, all four registers should initialize to zero. The control word queue 210 is in the uninitialized state while the Tail register is zero. During a boot sequence, the CPU 205 should allocate space for the control word queue and should set the First and Last registers to indicate the region allocated. At this time, the CPU 205 should set the Head and Tail registers to be equal to the First register. The control word queue 210 transitions to the idle state (since the Head and Tail registers are equal and the Tail is nonzero).

At some later time, the CPU 205 writes the first command into the control word queue 210 starting at the address in the Tail register. Once the CPU 205 has written a complete command to the control word queue 210, it updates the Tail register to point to the next unused control word. The CPU 205 may also write multiple commands to the control word queue 210 at a time before updating the Tail pointer. However, this will tend to limit overlap time between the crypto co-processor 250 and the CPU 205. The crypto co-processor 250 detects that the Head and Tail registers are no longer equal, which indicates the control word queue 210 has transitioned into the active state. The crypto co-processor 250 can begin fetching control words, interpret the fetched control words, and begin processing the commands contained within the control words.

Once the crypto co-processor 250 has completed a control word block (which contains one or more control words), the crypto co-processor records status information into the leading control word of the control word block. At this time, the crypto co-processor 250 also updates the Head register to point to the control word after the last in the group. As long as the Head and Tail registers are not equal, the control word queue 210 remains active and the crypto co-processor 250 continues processing control words.

Software 204 can monitor the Head register. When the Head register changes, software 204 can then read the status for the completed group from the control word queue 210.

In an alternate control register scheme, the control word queue 210 could be managed with 3 hardware registers: a Size register, a Head register, and a Tail register. This control register scheme requires that the control word queue 210 have $2^N$ entries, where N is a nonzero positive integer, and the control word queue be aligned to a $2^{N+3}$ byte boundary. In this scheme, size would hold the value of N. The crypto co-processor 250 and software would derive the addresses of the first and last addresses by:

$$\text{First=Head \& } \sim(2^{N+3}-1) \text{ Last=First}|(2^{N+3}-1)$$

All other aspects of the control word queue 210 operation would be substantially similar to that described above using four hardware registers.

As described above, multiple control words can be grouped into a single control word block. Using a control word block, the CPU 205 can specify the source packet as a collection of buffers in memory. The CPU 205 can specify a source address and length for each buffer, and can chain many buffers together to specify a complete source packet.

The control word block provides a high level interface for IPsec and SSL processing, while still supporting software access to the authentication and encryption algorithms. For outbound IPsec, the software 204 constructs a prototype packet in memory that contains all the data and IP header information needed to construct the final IPsec packet. For outbound SSL, the software 204 provides pointers to the pseudoheader concatenated with the application data. In both cases, software 204 provides one or more destination addresses, which point to memory sufficient to hold the output datagram. Inbound processing is similar, software 204 provides the crypto co-processor 250 with the inbound packet and a destination buffer large enough to hold the decoded, authenticated datagram. In addition to the data, the crypto co-processor 250 also needs pointers to the keys and initialization vectors (IV) used in authentication and encryption. These pointers to the keys and IVs can be included in the control word 212.

In one embodiment, control words have four basic formats: Initial control words, extension control words, final control words, and complete control words. In alternative embodiments, fewer or more than four control word formats may be used. The following exemplary four types of control words are provided for exemplary purposes only and should not limit the scope of the invention to only the described types of control words. As shown in Table 1A below, the composition of the control word block depends on the number of source packet fragments.

TABLE 1A

| Number of Source Packet Fragments | Use Complete Control Word? | Use Initial Control Word? | Number of Extension Control Words | Use Final Control Word? |
|---|---|---|---|---|
| 1 | Yes | No | 0 | No |
| 2 | No | Yes | 0 | Yes |
| 3 | No | Yes | 1 | Yes |
| 4+ | No | Yes | Number of fragments minus 2 | Yes |

The number entries in the control word queue 210 used by each type of control word is shown in Table 1B below. In one embodiment, each control word queue entry is 64 bits (8 bytes). In alternative embodiments, each control word queue entry could be larger or smaller than 64 bits.

TABLE 1B

| Control Word Type | Number of Control Word Queue Entries |
|---|---|
| Initial Control Word | 10 |
| Extension Control Word | 2 |
| Final Control Word | 2 |
| Complete Control Word | 10 |

An initial control word is the first control word in a control word block that has multiple control words. The CPU 205 can use multiple control words if the source packet is stored in more than one memory location. FIG. 5 is a graphical representation of an initial control word 212 that may be stored in the control queue 210, in accordance with one embodiment of the present invention.

The most significant bit of the operation field can be set to '1' to indicate an in-place operation or alternatively can be set to '0' to indicate a copy operation. An in-place operation implies that the destination address field is ignored. The remaining 7 bits indicate what high level operation the crypto co-processor 250 should perform for this control word block. Table 1C below documents the supported values for this field, according to an exemplary embodiment of the present invention. Values 64 and above indicate that the hardware does not inspect the packet to determine fields for encryption and decryption; instead, the operations to be performed are specified directly in the encryption type and authentication type fields based upon the opcode.

TABLE 1C

| Operation Field bits 1:7 Value | Meaning |
|---|---|
| 0 | Treat source data as IPv4 packet for IPsec transport processing |
| 1 | Treat source data as IPv6 packet for IPsec transport processing |
| 2 | Treat source data as IPv4 packet for IPsec tunnel processing |
| 3 | Treat source data as IPv6 packet for IPsec tunnel processing |
| 4 | Treat source data as SSL 3.0 data block |
| 5 | Treat source data as TLS 1.0 data block |
| 6-7 | Reserved |
| 8 | Treat source data as MPA (marker PDU aligned) ULPDU (upper-level protocol data unit) for outbound, or MPA FPDU (frame protocol data unit) for inbound processing. The first 32-bit word of the source data MUST be the first word of the ULPDU (outbound) or FPDU (inbound). Hardware will use the most significant 2 bytes of this 32-bit word as the ULPDU length for further processing. |
| 9-15 | Reserved |
| 16 | Treat source data as SSL pre-master data block for master secret generation. The source data must consist of the pre-master secret, followed by the ClientHello.Random and ServerHello.Random values. |
| 17 | Treat source data as SSL master secret and use the Length field to generate the SSL keyblock. Hardware ignores all fields except the Opcode, Length, Source Address, and Destination Address fields. |
| 18 | Treat source data as the SSL pre-master datablock and use the Length field to generate both the master secret and the key block. This operation combines opcodes 16 and 17. |
| 19 | Reserved |
| 20 | Treat source data as TLS pre-master data block for master key generation. The source data must consist of the pre-master secret, followed by the ClientHello.Random and ServerHello.Random values. |
| 21 | Treat source data as TLS master secret; use the Length field to generate the TLS keyblock. |
| 22 | Treat source data as TLS pre-master datablock. Use the Length field to generate both the master secret and the TLS keyblock immediately following the master secret. This opcode combines opcodes 20 and 21. |
| 23-31 | Reserved |
| 32 | For outbound packets, treat the source data as an IPv4 header. Parse the IP header, generate the header checksum, and place the checksum in the appropriate field in the header. For inbound packets, treat the source data as an IPv4 header, and validate the |

TABLE 1C-continued

| Operation Field bits 1:7 Value | Meaning |
|---|---|
| | header checksum. The computed checksum will be placed at the destination location for a copy operation; for an in-place operation, the checksum will only be validated. |
| 33 | For outbound packets, treat the source data as an IPv4 or IPv6 header encapsulating TCP or UDP data. For an outbound packet, hardware will parse the IPv4 and TCP/UDP headers and compute both the TCP/UDP payload checksum and the IPv4 header checksum. The checksums will be written at the appropriate offset into the destination. For inbound packets, hardware will compute and validate both the IPv4 header and TCP/UDP payload checksums. For IPv6, no header checksum will be computed or validated. |
| 34-40 | Reserved |
| 41 | For outbound packets, treat the source data as an IPv4 or IPv6 header encapsulating TCP data, which in turn encapsulates an MPA ULPDU. Compute and add padding bytes, markers, and generate the CRC32c to form the MPA FPDU. Then, generate and store both the TCP checksum and the IPv4 header checksum. The CPU 205 will parse the IP header and TCP header to determine the length of the TCP and IP headers. It will then read the size of the ULPDU from the appropriate offset from the TCP headers. For inbound data, treat the source as an IPv4 or IPv6 header encapsulating TCP data, which in turn encapsulates an MPA FPDU. The CPU 205 will validate the IPv4 and TCP checksums, then validate the CRC32c and markers. Assuming the checksums and CRC/marker validation succeed, the CPU 205 will remove the padding bytes, markers, and CRC32c, leaving an IP-encapsulated, TCP-encapsulated, MPA ULPDU at the destination.<br>The CPU 205 will not alter the IP length field. For an outbound packet, software must calculate the size increase due to padding bytes, markers, and the CRC32c, and adjust the TCP sequence number for the next packet and IP length before transmitting the packet. Similarly, on an inbound packet, software must derive the number of padding, marker, and CRC32c bytes from the IP length field and the header lengths. The CPU 205 will perform one pass over the source data for both inbound and outbound operations, thereby minimizing fetch and store bandwidth. |
| 42-63 | Reserved |
| 64 | Only perform the cipher as specified in the Encryption Type field, starting at the source address for the number of bytes specified in the Length field. The software 204 must ensure that the length is a multiple of the block cipher length; hardware will set an error bit in the Hardware Status Field if this is not the case. The entire length will be processed.<br>For an in-place operation, the source data will be overwritten with the ciphertext. For a copy operation, the ciphertext is written to memory starting at the destination address. |
| 65 | Only perform the authentication MAC (message authentication code) as specified in the Authentication type field starting at the source address for the number of bytes specified in length. The crypto co-processor 250 will implicitly pad the hash length as required by the hash algorithm. The crypto co-processor 250 will initialize the hash state from memory starting at the address contained in the Authentication IV field. For HMACs, (Hashed Message Authentication Codes) the crypto co-processor 250 will generate the hash key from memory starting at the address contained in the Authentication Key Address field.<br>For an in-place operation, the hash result is written to memory at the address specified in the Destination Address field. The number of bytes written is specified by the contents of the Hash Length field. The source data is not copied to the destination.<br>For a copy operation, the source data is copied to the address specified by the Destination Address field. The hash result is written to memory immediately following the copied source data. The length of the hash result is specified by the Hash Length field.<br>For either an in-place or a copy operation, the final state of the hash will be written to memory starting at the address specified by the contents of the Final Authentication State Address field. The length of the hash state is specified implicitly by the algorithm (MD5 —16 bytes; SHA-1 —20 bytes; SHA-256 —32 bytes). |
| 66 | Perform the cipher specified in the Encryption Type field, then perform the authentication specified by the Authentication Type field. The cipher operation starts at the byte named by the Source Address field. The length of the cipher is specified by the length field and must be a multiple of the block cipher length. The source address of the hash is computed by adding the 2nd Operation Offset field to the Source Address field. The length of the field to hash is specified by the 2nd Operation Length field. The length of the hash is specified by the Hash Length field. The IV for the hash is fetched from memory using the address specified in the Authentication IV Address field, and, if required, the hash key is fetched from the memory address specified by the contents of the Authentication Key Address field. The hash will be written to memory immediately following the last byte to be authenticated. The complete hash state will be written to memory starting at the address specified by the contents of the Final Authentication State Address field. This operation can be used to produce the encrypt, then hash for an outbound IPsec ESP with AH packet, or perform the decryption, then hash for an inbound SSL/TLS packet. |

TABLE 1C-continued

| Operation Field bits 1:7 Value | Meaning |
|---|---|
| 67 | Perform the hash specified in the Authentication Type field, then perform the cipher specified in the Encryption Type field. The field to be hashed starts at the source address and the length of the field to be hashed hash cipher is specified in the length field. The number of bytes in the computed hash is specified in the Hash Length field. The IV for the hash is fetched from memory using the address specified in the Authentication IV Address field, and, if required, the hash key is fetched from the memory address specified by the contents of the Authentication Key Address field. The hash will be written to memory immediately following the last byte of the field being hashed. The complete hash state will be written to memory starting at the address specified by the contents of the Final Authentication State Address field. The field to be encrypted is specified with the 2nd Operation Offset field by adding this offset to the Source Address field. The length of the data to be encrypted or decrypted is specified by the 2nd Operation Length field. This operation can be used to produce the hash, then encrypt operation for an outbound SSL/TLS packet, or hash, then decrypt operation for an inbound IPsec ESP with AH packet. |
| 68-69 | Reserved |
| 70 | This operation is substantially similar to opcode 66, except that the data field is encrypted in-place, regardless of the setting of opcode bit 0 (copy/in-place). The computed hash result is written to the address specified by the Destination Address field, instead of immediately following the field to be hashed.. The complete hash state is written to memory starting at the address specified by the contents of the Final Authentication State field. |
| 71 | This operation is substantially similar to opcode 67, except that the data field is encrypted in-place, regardless of the setting of opcode bit 0 (copy/in-place). The computed hash result is written to the address specified by the Destination Address field, instead of immediately following the field to be hashed. The complete hash state is written to memory starting at the address specified by the contents of the Final Authentication State field. |
| 72 | Reserved |
| 73 | This operation is substantially similar to opcode 65, except that no data is copied, regardless of the setting of opcode bit 0 (copy/in-place). Instead, an expected hash value is stored at the address specified by the Destination Address field. The crypto co-processor 250 computes the hash, compares it to the expected hash, then sets the AuthenticationFail bit of the Hardware Status field appropriately, then writes the computed hash to the location specified in the Destination Address field (overwriting the expected hash value). The complete hash state is written to memory starting at the address specified by the contents of the Final Authentication State field. |
| 74 | This operation is substantially similar to opcode 66, except that the data field is encrypted in-place, regardless of the setting of opcode bit 0 (copy/in-place). Instead, an expected hash value is stored at the address specified by the Destination Address field. The crypto co-processor 250computes the hash, compares it to the expected hash, then sets the AuthenticationFail bit of the Hardware Status field appropriately, then writes the computed hash to the location specified in the Destination Address field (overwriting the expected hash value). The complete hash state is written to memory starting at the address specified by the contents of the Final Authentication State field. |
| 75 | This operation is substantially similar to opcode 67, except that the data field is encrypted in-place, regardless of the setting of opcode bit 0 (copy/in-place). Instead, an expected hash value is stored at the address specified by the Destination Address field. Hardware computes the hash, compares it to the expected hash, then sets the AuthenticationFail bit of the Hardware Status field appropriately, then writes the computed hash to the location specified in the Destination Address field (overwriting the expected hash value). The complete hash state is written to memory starting at the address specified by the contents of the Final Authentication State field. |
| 76-127 | Reserved |

The Dir (Direction) bit indicates whether the datagram is inbound (Dir=1) or outbound (Dir=0). The Dir bit controls whether authentication generates or checks the MAC, and whether the packet is encrypted or decrypted. Inbound packets are decrypted and the MAC is checked; outbound packets are encrypted and the MAC is generated. The Direction field is only significant for valid opcodes in ranges 0-15 and 32-63. It is ignored for all other opcodes.

The SoB (Start of Buffer) bit is set to 1 for the initial control word. It indicates the first control word of a control word block. The SoB bit is also set to 1 for a complete control word.

The EoB (End of Buffer) bit is set to 0 for the initial control word. The EoB bit is set to 1 for a complete control word or a final control word.

The Int (Interrupt) bit causes the crypto co-processor 250 to interrupt the thread (Core) specified in the Core ID field upon completion of this control word block.

The Core ID specifies which thread within the CPU 205 should receive an interrupt if the Int bit is set.

The Authentication Type field specifies what algorithm to use for authentication. Table 2 below documents the meaning of the bits in this field according to an exemplary embodiment of the present invention.

TABLE 2

| Authentication Type Field Bit Position | Name | Description |
|---|---|---|
| 0 | Valid | If one, perform authentication. If zero, do not perform authentication. |
| 1 | SHA-1 | If one, perform SHA-1 authentication. |
| 2 | SHA-256 | If one, perform SHA-256 authentication. |
| 3 | MD5 | If one, perform MD5 authentication. |
| 4 | HMAC_SHA-1 | If one, perform the HMAC using SHA-1. |
| 5 | HMAC_SHA-256 | If one, perform the HMAC using SHA-256. |
| 6 | HMAC_MD5 | If one, perform the HMAC using MD5. |
| 7 | CRC32c | If one, perform the iSCSI/RDMA CRC32c computation using the polynomial 0x11EDC6F41. |

Only one of bits 1 to 7 can be set. For an outbound packet, the crypto co-processor 250 will write the computed hash value at the appropriate offset in the destination packet. For an inbound packet computed in-place, crypto co-processor 250 will generate and check the hash against the incoming hash value and set the hardware status flag appropriately. For an inbound packet processed with a copy operation, the crypto co-processor 250 will compute the hash and store it at the appropriate offset in the destination packet, in addition to comparing the hash and setting the status flag. In the event of an authentication failure, software 204 can then inspect the original and computed hash values.

The Encryption Type field specifies what algorithm to use for encryption. Table 3 below documents the meaning of the bits in this field. The key schedules can be generated by hardware for those ciphers requiring key generation (AES). Alternatively, the key schedule can be loaded from memory.

TABLE 3

| Encryption Type Field Bit Position | Name | Description |
|---|---|---|
| 0 | Vaild | If one, perform encryption. If zero, do not perform encryption. |
| 1 | IV Valid | If one, use the initialization vector at the Encryption Initialization Vector Address. If zero, use an initialization vector of all zeroes. |

TABLE 3-continued

| Encryption Type Field Bit Position | Name | Description |
|---|---|---|
| 2:5 | Algorithm | Specifies the encryption algorithm to use<br>0000 - DES<br>0001 - Triple DES<br>0010 - RC4<br>0011 - Reserved<br>0100 - AES 128<br>0101 - AES 192<br>0110 - AES 256<br>0111 - Reserved<br>1000-1011 Reserved<br>1100 - AES 128 counter mode<br>1101 - AES 192 counter mode<br>1110 - AES 256 counter mode<br>1111 - Reserved |
| 6:7 | Chaining | Specifies the type of chaining:<br>00 - ECB<br>01 - CBC |

The Length field specifies the length (in bytes) of the first source data block. The first data block starts at the source address specified in the initial control word.

The HW Status field is used, by the crypto co-processor 250, to return error status about the authentication and encryption operation to the software 204. If no status bits are set, the operation completed successfully. Table 4 provides additional details of the HW Status field.

TABLE 4

| HW Status Field Bit Position | Name | Description |
|---|---|---|
| 0 | AuthenticFail | This bit is set by the crypto co-processor 250 if authentication fails for inbound packets. |
| 1 | IPv4 checksum failure | The IPv4 header checksum for an inbound packet failed validation. |
| 2 | TCP/UDP payload checksum failure | The TCP or UDP payload checksum failed validation. |
| 3 | MPA marker failure | At least one of the markers in the MPA FPDU failed to match the expected offset from the start of the FPDU. |
| 4 | MPA CRC32c failure | The computed CRC32c in an MPA FPDU failed to match the expected value. |
| 5 | EncryptLenFail | The encryption length is not a multiple of the cipher block size. |
| 6 | UncorrectableHardware Error | A hardware error occurred which the hardware could not correct. The major cause of a hardware error is an uncorrectable data error when fetching data from memory or reading it from a register. |
| 7 | Reserved | |

The Authentication Key Address field holds the physical address of the key to use for authentication.

The Authentication IV (initialization vector) Address field holds the physical address of the IV for authentication. The appropriate number of bytes starting at this address (e.g., MD5-16; SHA-1-20; SHA-256-32) are used to load the authentication state.

The Final Authentication State Address field holds the physical address where the complete contents of the authentication state will be written when the authentication operation is complete. The appropriate number of bytes (e.g., MD5-16; SHA-1-20; SHA-256-32) are written to memory at this address.

The Encryption Key Address field holds the physical address of the key (or key schedule) to use for encryption.

The Encryption Initialization Vector Address field holds the physical address of the initialization vector for encryption. In the event that the initial control word specifies that encryption should not be performed or that the initialization vector should be zeroes, this field is ignored by the crypto co-processor 250. For SSL or TLS encryption operation, this pointer may also point to a 32-bit sequence number (that is, the sequence number may be stored after the IV in memory).

The Source Address field specifies the physical address location of the first segment of the source packet or data. From this address, the crypto co-processor 250 will process the number of bytes specified in the Length field.

The Destination Address field specifies the physical address where the crypto co-processor 250 should write its results. Software 204 must allocate space for the crypto co-processor 250 result (and ensure that the crypto co-processor 250 will not overwrite other data). For some crypto co-processor 250 operations (e.g., opcodes 73-75), this field specifies the location of a hash result that the hardware compares with its generated result.

The Hash Length field specifies the length of the hash value in bytes that the crypto co-processor 250 will generate and/or compare. The value in hash length field is one less than the actual hash length computed or compared (e.g., 255 means a 256B hash will be computed or compared).

The 2nd Operation Offset field specifies the offset from the source address for the second of two operations specified by opcodes 66 and 67. The offset is a signed, two's-complement 16-bit number that is added to the Source Address to specify the starting address for the second operation. This field is ignored for operations other than those specified by opcodes 66 and 67.

The 2nd Operation Length field specifies the length (in bytes) of the second operation for operations specified by opcodes 66 and 67. This field is ignored for operations specified by other opcodes.

FIG. 6 shows an extension control word 600 in accordance with one embodiment of the present invention. The extension control word 600 specifies the location of the second or subsequent source packet fragments. The Length and Source Address fields are used in the same manner as in the initial control word.

FIG. 7 shows a final control word 700 in accordance with one embodiment of the present invention. The final control word 700 specifies the location of the last source packet fragment. The Length and Source Address fields are used in the same manner as in the initial control word 500. The End of Block field must be set to one.

The complete control word specifies a command for a source packet that is stored in one location. It is substantially similar to the initial control word 500, the major difference is that the End of Buffer field is set to one. The complete control word is a control word block that contains a single control word. The fields included in the complete control word are the same as described in the initial control word 500.

The crypto co-processor 250 can also be directly accessed via the interface 215. In one embodiment, the interface 215 is a set of hardware registers. The interface 215 allows direct control of crypto co-processor 250 operations without using the control word queue 210. The interface 215 also allows taking a supervisor trap. By way of example, the interface 215 can be useful to support "short" crypto operations, such as encryption of small XML blocks.

The interface 215 can also use a set of per-thread hardware registers 216 (so each register is replicated 8 times per CPU 205). These registers 216 contain data and commands to instruct the crypto co-processor 250 to perform an operation, as well as containing results from these operations. A bit is defined to enable lazy save/restore of these registers. Each register 216 includes the following information for the crypto co-processor 250: Length, Operation Type, Source Data and Keys and/or initialization vectors.

After performing the operation, the crypto co-processor 250 will return the result via the result registers. In one embodiment, the supported hashes have a block size of 512 bits, and the ciphers have block sizes of one byte (RC4), 128 bits (AES), and 64 bits (DES), therefore at least 512 bits must be provided in registers to contain the source data. At least 256 bits must be provided in result registers, since the hash lengths are 128 (MD5), 160 (SHA-1), and 256 (SHA-256), with cipher outputs as mentioned above. For AES, space for a 256-bit key is required, and a 128-bit initialization vector (IV) may be required. Additionally, for RC4, a 258-byte state initialization is required (256B state matrix+2 1 B indices). A separate, threaded set of 33 hardware registers can be used to store the RC4 state and indices.

FIG. 8A shows a set of non-RC4 registers in accordance with one embodiment of the present invention. The non-RC4 registers are defined as follows, with each register definition occupying 2 rows of the FIG. 8A. Register 1 is the control register and must be written last. Registers 2-9 contain source data. Registers 10-13 contain cipher key data. Registers 14-15 contain cipher initialization vector data on input. For AES counter mode, these registers contain the {nonce[31:0]||IV[63:0]||counter[31:0]}. The crypto co-processor 250 will initialize the counter block with this value and increment the counter for subsequent blocks. This data is used by the cipher operation unless ECB mode is specified. Registers 16-19 contain the authentication key for HMAC operations. Registers 20-27 contain the ciphertext. Registers 28-31 contain the hash initialization vector (on input), and the hash result on output.

Control register 0 controls access to the crypto co-processor 250. It is a privileged, per strand hardware register. FIG. 8B shows a format of Control Register 0 in accordance with one embodiment of the present invention. The register 0 includes an enabled bit. This enabled bit controls access to the crypto co-processor 250 between processes running on the same thread. If enabled is set, any read or write to control register 1, the source data registers, key data registers, and result data/initialization vector registers is permitted and performed. If enabled is not set, any read or write to these registers causes a precise trap. Accesses to control register 0 (by privileged code) are always allowed. As part of a context switch, software 204 should reset the enabled bit. If another process accesses the facility, the resulting trap can be used to save the registers. The trap handler should set the enabled bit (to grant itself access to the registers), then save crypto state. The trap handler must not be interrupted. The handler can determine if the registers must be saved. After the registers have been saved, control can be transferred to the interrupted process.

The software 204 can also ensure that the crypto co-processor 250 is idle (therefore having completed the previous operation) before attempting to save the state from the previous process. Some operations are not restartable since the initialization vector registers are shared with the result registers. An exemplary prototype trap handler organization is:

Set control register 0 enabled bit

Read control register 1 using synchronous stalling load (the load will wait for operation to complete—Busy bit will be 0).

Save control registers (other crypto state, such as RC4 state, may also have to be saved).

Re-enable the process that caused the trap.

FIG. 8C shows an exemplary format of control register 1 in accordance with one embodiment of the present invention. The operation field depicts the operation to be performed. The Control register 1 must be the last register to be written before starting an operation (i.e., all other registers must be written first). When an operation is started by writing to the control register, the crypto co-processor 250 will arbitrate among the control word queue operations that are pending as well as any other register operations from other threads before starting this operation. The crypto co-processor 250 will set the status field when either the operation is complete or an error has been detected. Fields in the control register 1 are described below.

Operation—The operation field encodes the operation to be performed as follows. For cipher operations, the Direction field specifies whether encryption or decryption is performed. The operations field codes are similar to their control word counterparts but direct IPsec or SSL/TLS decoding functions are not supported. The following Table 6 shows the operation field code definitions according to one embodiment of the present invention.

TABLE 6

| Operation Field bits 0:7 Value | Meaning |
| --- | --- |
| 0-63 | Reserved |
| 64 | Only perform the cipher as specified in the Encryption Type field starting at the most significant byte of Source Data Register 0 + the number of bytes specified in the Encryption Offset field, and encrypt the number of bytes specified by the Encryption Length field. The encrypted (or decrypted) result will be written to the Cipher Result registers, at the same corresponding offset. Software 204 must ensure that the Encryption Length is a multiple of the block cipher length. |
| 65 | Only perform the authentication as specified in the Authentication Type field starting at the most significant byte of Source Data Register 0 + the number of bytes specified in the Hash Offset field, for the number of bytes specified in the Hash Length field. The crypto co-processor 250 will implicitly pad the hash length as required by the hash algorithm. The hash will be written to the Hash Result registers. Unused bytes within a Hash Result register will be filled with zeroes (for SHA-1, only the least significant 4 bytes of Hash Result Register 2 will be filled, and the remaining bytes will be zeroed, and Hash Result Register 3 will not be affected). |
| 66 | Perform the cipher specified in the Encryption Type field, then perform the authentication specified by the Authentication Type field. The cipher operation starts at the most significant byte of Source Data Register 0 + the Encryption Offset. The length of the cipher is specified by the Cipher Length field and must be a multiple of the block cipher length. The cipher data will be written to the Cipher Result registers starting at the corresponding byte location of the source; unused result registers will not be affected.<br>The source address of the hash is computed by adding the Hash Offset field to the location of the most significant byte of Source Data Register 0. The length of the field to hash is specified by the Hash Length field. The hash will be written to the Hash Result registers as specified in Operation 65 above.<br>This operation can be used to produce the encrypt, then hash for an outbound IPsec ESP with AH packet, or perform the decryption, then hash for an inbound SSL/TLS packet. |
| 67 | Perform the hash specified in the Authentication Type field, then perform the cipher specified in the Encryption Type field. The field to be hashed starts at the most significant byte of Source Data Register 0 + the contents of the Hash Offset field; the length of the hash is specified in the Hash Length field. The cipher starts at the most significant byte of Source Data Register 0 + the Encryption Offset field; the length of the cipher is specified in the Encryption Length field. The hash will be written to the Hash Result registers as in Operation 65 above. The ciphertext will be written to the Cipher Data registers as specified in Operation 64 above.<br>This operation can be used to produce the hash, then encrypt operation for an outbound SSL/TLS packet, or hash, then decrypt operation for an inbound IPsec ESP with AH packet. |
| 68-255 | Reserved |

Dir(Direction) bit—the direction bit is specifies the direction of cipher operation for AES and DES/3DES. If set, encryption is performed; if reset, decryption is performed.

Authentication Type—This field specifies what algorithm to use for authentication. The Table 7 below documents the meaning of the bits in this field according to one embodiment. Only one of bits 1 to 7 are typically set at a time.

TABLE 7

| Authentication Type Field Bit Position | Name | Description |
| --- | --- | --- |
| 0 | Valid | If one, perform authentication. If zero, do not perform authentication. |
| 1 | SHA-1 | If one, perform SHA-1 authentication. |
| 2 | SHA-256 | If one, perform SHA-256 authentication. |
| 3 | MD5 | If one, perform MD5 authentication. |
| 4 | HMAC_SHA-1 | If one, perform the HMAC using SHA-1. |
| 5 | HMAC_SHA-256 | If one, perform the HMAC using SHA-256. |
| 6 | HMAC_MD5 | If one, perform the HMAC using MD5. |
| 7 | CRC32c | If one, perform the iSCSI/RDMA CRC32c computation using the polynomial 0x11EDC6F41. |

The encryption type field specifies what algorithm to use for encryption. Table 8 below documents the meaning of the bits in this field according to one embodiment. The key schedules can be generated by the crypto co-processor 250 for those ciphers requiring key generation (AES). Alternatively, a key schedule can also be loaded from memory.

TABLE 8

| Encryption Type Field Bit Position | Name | Description |
| --- | --- | --- |
| 0 | Valid | If one, perform encryption. If zero, do not perform encryption. |
| 1 | IV Valid | If one, use the initialization vector in the Cipher Initialization Vector registers. If zero, use an nitialization vector of all zeroes. |
| 2:5 | Algorithm | Specifies the encryption algorithm to use<br>0000 - DES<br>0001 - Triple DES<br>0010 - RC4<br>011 - Reserved<br>0100 - AES 128<br>0101 - AES 192<br>0110 - AES 256<br>0111 - Reserved<br>1000-1011 Reserved<br>1100 - AES 128 counter mode<br>1101 - AES 192 counter mode<br>1110 - AES 256 counter mode<br>1111 - Reserved |
| 6:7 | Chaining | Specifies the type of chaining:<br>00 - ECB<br>01 - CBC |

The HW status field contains status pertaining to the current (or last) co-processor 250 operation. Table 9 defines the HW status field contents according to one embodiment.

TABLE 9

| HW Status Field Bit Position | Name | Description |
| --- | --- | --- |
| 0 | Busy/NotIdle | This bit is set upon writing Control Register 1 with a valid operation. It is reset when the crypto unit completes the specified operation. Software 204 may poll this bit to determine when the crypto operation is complete. Alternatively, a load of this register using a register will stall until the Busy/NotIdle bit is reset, to allow software to wait synchronously. |
| 1 | CipherLengthError | This bit is set when the crypto co-processor 250 detects an invalid length for the specified cipher operation. |
| 2 | HashLengthError | This bit is set when hardware detects a non-zero Hash Offset field with a 64 byte Hash Length field. |
| 3 | UncorrectableHardwareError | A hardware error occurred which the crypto co-processor 250 could not correct. The major cause of a hardware error is an uncorrectable data error when fetching data from memory or reading it from a register |
| 4-7 | Reserved | |

The en (encryption) length field specifies the length of cipher operations. Table 10 describes the en length field contents according to one embodiment. Only certain values are permitted for a given operation. The crypto co-processor 250 may check the length and signal an invalid length error if these rules are violated. The value in the en length field is one less than the cipher length (e.g., 0x0f is stored for a 16 byte operation).

TABLE 10

| Operation | Permissible Length field values(in bytes) |
| --- | --- |
| AES-128 | {16, 32, 48, 64} − 1 |
| AES-192 | {16, 32, 48, 64} − 1 |
| AES-256 | {16, 32, 48, 64} − 1 |
| DES | {8, 16, 24, 32, 40, 48, 56, 64} − 1 |
| 3DES | {8, 16, 24, 32, 40, 48, 56, 64} − 1 |
| RC4 | {1 ... 64} − 1 |

The ha (hash) length field specifies the length of hash operations. Table 11 describes the ha length field contents according to one embodiment. If the hash length is not 64, the crypto co-processor 250 will pad the length as required by the hash algorithm prior to performing the hash. The value in the ha length field is one less than the hash data length (e.g., 0x0f is stored for a 16 byte operation).

TABLE 11

| Operation | Permissible Length field values(in bytes) |
| --- | --- |
| MD5 | {1 ... 64} − 1 |
| SHA-1 | {1 ... 64} − 1 |
| SHA-256 | {1 ... 64} − 1 |
| HMAC_MD5 | {1 ... 64} − 1 |
| HMAC_SHA-1 | {1 ... 64} − 1 |
| HMAC_SHA-256 | {1 ... 64} − 1 |

The en (encryption) offset is a positive offset in bytes from the high-order byte of source data register 0 where the encryption operation will start. The crypto co-processor can support an arbitrary byte alignment. The crypto co-processor 250 can also signal a length error if the (encryption offset+encryption length)>64. The en offset field may be used, for example, when processing the first block of an outbound IPsec ESP mode packet with AH. In this case the encryption offset is 8 bytes from the start of the data field, to allow the software 204 to load the data registers starting with the AH.

The ha (hash) offset is a positive offset in bytes from the high-order byte of source data register 0 where the hash operation will start. The crypto co-processor 250 can support an arbitrary byte alignment. For a 64-byte hash, the ha offset field should be 0. The crypto co-processor 250 can also signal an invalid hash length error otherwise. In practice, only one of the en offset or ha offset fields would be nonzero.

The following Table 12 describes how to fill in the registers for each operation type that is supported, as well as limitations on the operation type, for one embodiment.

TABLE 12

| Operation | Control Register | Source Data | Key Data | Initialization Vector | Result | Restrictions |
| --- | --- | --- | --- | --- | --- | --- |
| AES encryption/ decryption | Fill in Operation, Direction, Encryption Type, Encryption Offset, and Encryption Length (length must be a multiple of 16 bytes) | 2, 4, 6, or 8 64-bit words | 2, 3, or 4 64-bit words based upon key size | 2 64-bit words or all zeroes if unused | Same as source length | Source data can only be 2, 4, 6, or 8 64-bit words |
| DES encryption/ decryption | Fill in Operation, Direction, Encryption Type, Encryption Offset, and Encryption Length (length must be a multiple of 8 bytes) | 1 to 8 64-bit words | 1 64-bit word with low-order bit of each byte odd parity | 1 64-bit word or all zeroes if unused | 1 to 8 64-bit words as source length | Source data must be 1 to 8 64-bit words in length |
| 3DES encryption/ decryption | Same as DES | Same as DES | 3 64-bit words with low-order bit of each byte odd parity | Same as DES | Same as DES | Same as DES |
| RC4 | Fill in Operation, Direction, Encryption Type, Encryption Offset, | Any number of bytes from 1 to 64 | — | — | Same as source length | RC4 state matrix must be preloaded via 33 64-bit register writes prior to performing this |

TABLE 12-continued

| Operation | Control Register | Source Data | Key Data | Initialization Vector | Result | Restrictions |
|---|---|---|---|---|---|---|
| | Encryption Length, and State Registers | | | | | operation |
| MD5 | Fill in Operation, Authentication Type, Hash Offset, and Hash length | Any number of bytes from 1 to 64 | Ignored | 2 64-bit words as necessary (or all zeroes) | 2 64-bit words | Hardware will pad input data |
| SHA-1 | Fill in Operation, Authentication Type, Hash Offset, and Hash length | Any number of bytes from 1 to 64 | Ignored | 2.5 64-bit words (160 bits) as necessary, or all zeroes | 2.5 64-bit words (160 bits) | Hardware will pad input data |
| SHA-256 | Fill in Operation, Authentication Type, Hash Offset, and Hash length | Any number of bytes from 1 to 64 | Ignored | 4 64-bit words as necessary, or all zeroes | 4 64-bit words | Hardware will pad input data |
| HMAC_MD5 | Fill in Operation, Authentication Type, Hash Offset, and Hash length | Any number of bytes from 1 to 64 | Fill in first 2 64-bit key words with 128-bit key | 2 64-bit words as necessary (or all zeroes) | 2 64-bit words | Hardware will pad input data |
| HMAC_SHA-1 | Fill in Operation, Authentication Type, Hash Offset, and Hash length | Any number of bytes from 1 to 64 | Fill in first 2.5 64-bit words (160 bits) with key | 2.5 64-bit words (160 bits) as necessary, or all zeroes | 2.5 64-bit words (160 bits) | Hardware will pad input data |
| HMAC_SHA-256 | Fill in Operation, Authentication Type, Hash Offset, and Hash length | Any number of bytes from 1 to 64 | Fill in 4 64-bit words with 256-bit key | 4 64-bit words as necessary, or all zeroes | 4 64-bit words | Hardware will pad input data |
| Encrypt then Hash or Hash then Encrypt | Fill in Operation, Authentication Type, Hash Offset, Hash Length, Encryption Type, Dir, Encryption Offset, and Encryption Length | Any number of bytes for hash; cipher length must be a multiple of block cipher length | As required | As required | As specified | Cipher Length must be a multiple of block cipher length |

FIG. 9 shows the RC4 state registers 900 according to one embodiment of the present invention. State register i contains bytes 8*i to 8*i+7, inclusively. Registers 4-27 are omitted from FIG. 9 for brevity but are actually included.

Figure 10:
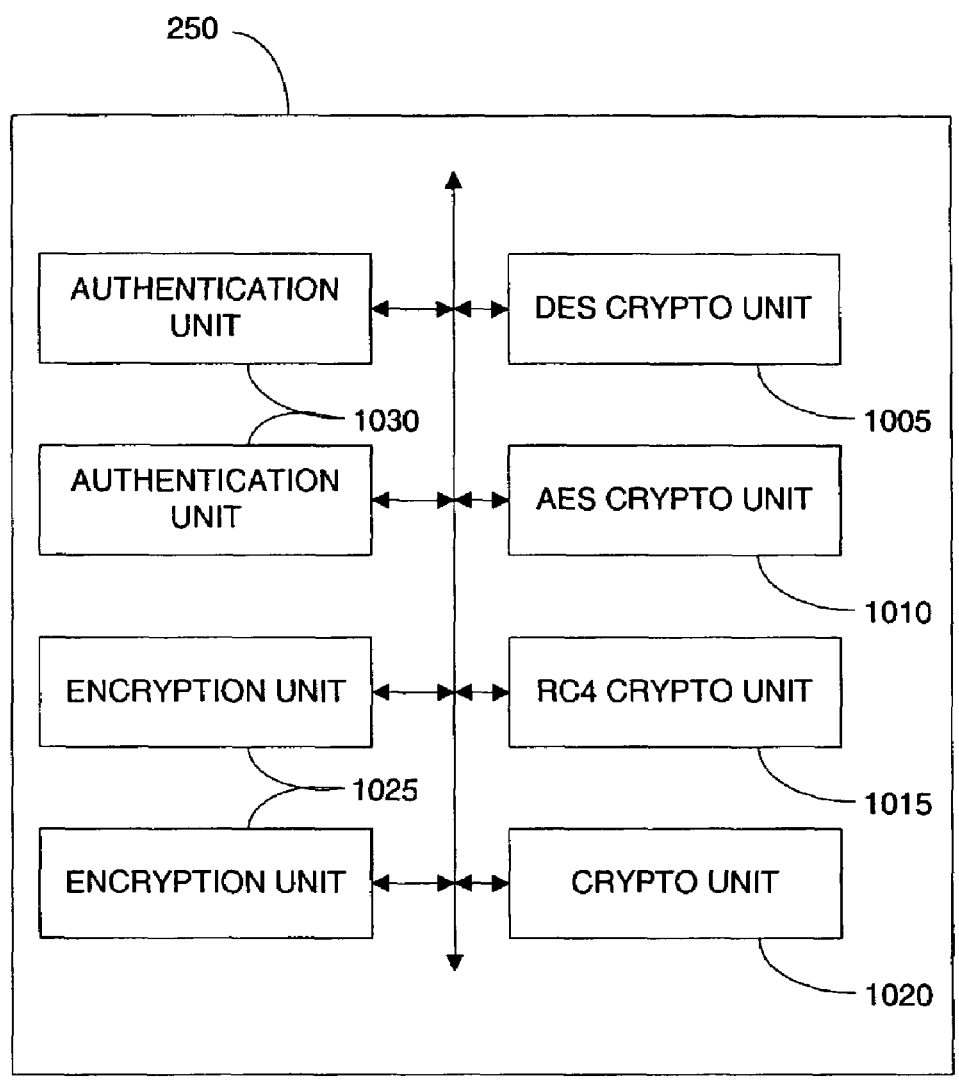
FIG. 10 is a block diagram of the crypto co-processor in accordance with one embodiment of the present invention.

FIG. 10 is a block diagram of the crypto co-processor 250 in accordance with one embodiment of the present invention. The crypto co-processor can include multiple specialized cryptographic (crypto) units 1005, 1010, 1015, 1020, encryption unit 1025 and authentication unit 1030. Each of the crypto units 1005, 1010, 1015, 1020 can be a specifically designed arithmetic unit that has been designed and optimized for a specific type of cryptographic processing. By way of example, crypto unit 1005 is designed and optimized for DES processing, while crypto unit 1010 is optimized for AES processing and crypto units 1015, 1020 are optimized for yet another type of crypto processing such as performing hashing functions (e.g., RC4, MD5, SHA-1, SHA-256) or key generation functions or other types of crypto processing (e.g., elliptic curve cryptography). As a result, the corresponding type of crypto unit can be selected for the type of cryptographic operations required which thereby speeds the crypto processing. Further, having multiple crypto units 1005, 1010, 1015, 1020 can allow the crypto co-processor 250 to process multiple crypto packets simultaneously (i.e., multi-threading) which can further accelerate the crypto packet processing. Further, if the crypto co-processor 250 can process more than one crypto packet at a time, then the CPU 205 will not be stalled if a second crypto packet is received before the crypto co-processor has completed processing of a first crypto packet. This multi-threading capability can also provide more efficient crypto processing for nested crypto processes and for processing encrypted data streams.

IPsec is an abbreviation for IP Security and includes a set of protocols developed by the IETF to support secure exchange of packets at the IP layer. IPsec has been deployed widely to implement Virtual Private Networks (VPNs). IPsec,supports two encryption modes: Transport and Tunnel. Transport mode encrypts only the data portion (payload) of each packet. The Tunnel mode encrypts both the header and the payload. On the receiving side, an IPsec-compliant device decrypts each packet. For IPsec to work, the sending and receiving devices must share a public key. This is accomplished through a protocol known as Internet Security Association and Key Management Protocol (ISAKMP), which allows the receiver to obtain a public key and authenticate the sender using digital certificates.

There are 4 basic formats of an IPsec packet, relating to AH/ESP and transport/tunnel modes. There are sub-formats based upon IPv4 or IPv6, which we will not detail here. IPv4 is used to illustrate the processing; IPv6 is similar. The crypto co-processor 250 will support parsing of IPv4 and IPv6 options to locate the AH/ESP headers.

FIG. 11A shows an exemplary format of an IPsec packet encapsulating a TCP datagram for transport mode AH, in accordance with one embodiment of the present invention. Authentication is performed over the complete packet contents.

Before passing an outbound IPsec packet to the CPU 205, the software 204 processes the original IP datagram and insert the authentication header with the next header, length, SPI, and sequence number fields filled in. The crypto co-processor 250 computes the HMAC hash. The crypto co-processor 250 fills in the (typically 96-bit) authentication data field. Authentication covers all fields in the packet except for the mutable fields in the IP header (TOS, TTL, etc.) and the hash result value in the AH. Crypto co-processor 250 zeroes out the mutable fields prior to the hash computation. An appropriate hash hardware unit of the crypto co-processor 250 implicitly pads the packet data as required by the HMAC algorithm. Once the crypto co-processor 250 completes processing, the packet is a legal IPsec packet (i.e., no further software formatting is required), and the packet may be passed directly to network software for further processing (e.g., fragmentation).

The crypto co-processor 250 will support other header lengths to allow for different-length authentication data fields. The crypto co-processor 250 can include one or more hardware units 1005-1030 that can compute the length of the authentication data field as the header length minus the appropriate default. By way of example, for IPv4, hardware will compute the authentication data field length as Header-Length—1 32-bit words. The crypto co-processor hardware units 1005-1030 does not change the mutable field contents in memory. The crypto co-processor hardware units 1005-1030 can be an IPv4 and IPv6-aware hardware state machine. The IPv4 AH length field is 2 less than the actual size of the field in 32-bit words.

One or more of the crypto co-processor hardware units 1005-1030 could also fill in the hash in-place without copying the entire packet to a new memory area. The destination address could be the address of the authentication data field in the AH, and the crypto co-processor 250 hardware would have to be instructed to produce the hash without a copy. Alternatively, the crypto co-processor 250 could parse the packet contents and determine the appropriate AH offset from the length of the IP header.

For inbound packets, software 204 programs the control word 212 with the address of the packet and the appropriate hash algorithm and key. The crypto co-processor hardware units 1005-1030 compute the hash, compares it with the hash value in the authentication header field, and returns status in the control word 212. No copy operation is required.

FIG. 11B shows an exemplary format of an IPsec packet encapsulating a TCP datagram for tunnel mode AH, in accordance with one embodiment of the present invention.

The operations performed by software 204 and the crypto co-processor hardware units 1005-1030 for this case are analogous to transport mode AH. For an outbound packet, software prepares the packet in memory and passes the source address, HMAC algorithm, and key to the crypto co-processor 250. Authentication can be done in-place or the packet can be copied to a new destination. The crypto co-processor hardware units 1005-1030 compute the hash and write the hash result in the AH.

For an inbound packet, software 204 prepares a control word 212 that specifies the source address of the packet, the HMAC algorithm, and key. The crypto co-processor hardware units 1005-1030 compute and validate the hash, and write the validation status into bit 0 of the Hardware Status field of the initial control word.

FIG. 11C shows an exemplary general packet format for transport mode ESP, in accordance with one embodiment of the present invention. Authentication may be optionally performed over the packet from the ESP header to the ESP trailer fields, inclusively, while encryption is performed over the field following the ESP header to the ESP trailer fields, inclusively. FIG. 11D shows a more detailed view of the packet format starting at the ESP header in accordance with one embodiment of the present invention.

For an outbound packet, the process is similar to AH mode. Software 204 first produces a skeleton for the packet by filling in the required fields in the packet. This includes the SPI, sequence number, padding, pad length, and next header fields. The padding and pad length must be computed appropriately given the encryption algorithm. The rationale behind requiring software 204 to generate the padding and pad length fields is twofold. The first is to provide flexibility and improved security, in case software wants to "randomize" the packet lengths to frustrate traffic analysis. The second is to simplify the crypto hardware portions 1005-1030. If this flexibility is not required, the crypto co-processor hardware units 1005-1030 can generate the minimal required padding and pad length fields prior to encryption, and then update the IP header length field to account for the padding and pad length fields which were added.

After filling out the packet skeleton, the software 204 then generates a control word 212 that contains the source address of the packet (perhaps spread across several control words), the authentication algorithm, the authentication key, the cipher algorithm, the cipher key, and cipher initialization vector (IV), and the destination address to the crypto co-processor hardware units 1005-1030. The crypto co-processor hardware units 1005-1030 compute the encryption start address and length as follows. The encryption start address is computed as source address+IP header length (including options, if any)+8; the encryption length is computed as IP_header.len−12−8. The hardware units 1005-1030 will encrypt the relevant fields of the packet, and then authenticate the relevant fields of the packet, writing the HMAC hash to the authentication data fields. The hardware units 1005-1030 can encrypt and hash in parallel, with the hash running slightly behind encryption and using the encrypted data. The hardware units 1005-1030 can also check that the encryption length is a multiple of the cipher block size. If the check fails, the hardware units 1005-1030 should terminate the operation and report the failure.

An in-place encryption and authentication operation can be performed if the source data exists in one continuous buffer.

Otherwise the hardware units 1005-1030 will copy the encrypted, authenticated source packet to the destination.

For an inbound packet, software 204 constructs a control word 212 that contains the source address, the authentication and decryption algorithms, and associated keys and initial vector, for decryption. The crypto co-processor hardware units 1005-1030 compute the decryption offset and length as above before authenticating and decrypting the packet, and returning authentication status. Authentication and decryption can be performed in parallel, with the HMAC using the encrypted data. As for outbound packets, decryption can be performed in-place, or the decrypted, authenticated packet can be copied to a new location.

FIG. 12 shows a general packet format for a tunnel mode ESP, according to one embodiment of the present invention. Operation in tunnel mode ESP is substantially similar to transport mode described above.

Tunnel mode bundles (i.e., nested IPsec protocols) are recognized by software 204 and handled as separate control word queue operations. One supported bundle is transport mode AH followed by ESP. FIG. 13 shows an exemplary packet format of a transport mode bundle in accordance with one embodiment of the present invention. In this mode, ESP authentication is not used, so there is no ESP authentication trailer.

FIG. 14 shows an exemplary packet (record) format before SSL/TLS in accordance with one embodiment of the present invention. SSL is an abbreviation for Secure Sockets Layer, a protocol developed by Netscape for transmitting private documents via the Internet. SSL works by using a public key to encrypt data that's transferred over the SSL connection. Both Netscape Navigator and Internet Explorer support SSL, and many Web sites use the protocol to obtain confidential user information, such as credit card numbers. By convention, URLs that require an SSL connection start with "https:" instead of "http:."

TLS is an abbreviation for Transport Layer Security, a protocol that guarantees privacy and data integrity between client/server applications communicating over the Internet. The TLS protocol is made up of two layers: the TLS record protocol and the TLS handshake protocol.

The TLS record protocol is layered on top of a reliable transport protocol, such as TCP, it ensures that the connection is private by using symmetric data encryption and it ensures that the connection is reliable. The TLS Record Protocol also is used for encapsulation of higher-level protocols, such as the TLS Handshake Protocol. The TLS handshake protocol allows authentication between the server and client and the negotiation of an encryption algorithm and cryptographic keys before the application protocol transmits or receives any data.

TLS is application protocol-independent. Higher-level protocols can layer on top of the TLS protocol transparently. Based on Netscape's SSL 3.0, TLS supercedes and is an extension of SSL.

FIG. 15 shows an exemplary encrypted packet format for SSL/TLS in accordance with one embodiment of the present invention. The ciphertext can be 2KB larger than the plaintext. More specifically, the ciphertext is generated by (optionally) using the HMAC function to produce a hash of the original data field that is appended to the data field, then encrypting the data and optional hash. The HMAC can require a sequence number in addition to a key. The data and the MAC can then be encrypted. In the case of a block cipher, the data and MAC may be padded with up to 255 bytes of padding. A final byte can specify the length of the padded data (exclusive of the pad length byte). FIG. 16 shows an exemplary encrypted packet format with the final byte defining the length of the padded data, in accordance with one embodiment of the present invention.

For an outbound packet, software 204 prepares a source area in memory with the packet format as above. The software 204 fills in the padding and pad length fields, taking care that the resulting total length is a multiple of the block cipher size, and sets the Length field to be the total data+MAC+Padding+1. Similar to ESP mode IPsec, forcing software to generate the packet padding allows flexibility and simplifies the hardware units 1005-1030 of the crypto co-processor 250.

The hardware units 1005-1030 compute the HMAC over the type, major, minor, length, and data fields (the length of data for HMAC is computed as Length−(Pad length+1+MAC_length) for TLS and length−(pad length+1+MAC_length+2) for SSL, where MAC_length is the length of the resulting hash). The hardware portions 1005-1030 also compute the encryption offset as (source address+5) and the encryption length is Length. The hardware portions 1005-1030 also check to make sure the encryption length is a multiple of the cipher block size. The hardware portions 1005-1030 then encrypt the data, MAC, padding, and pad length fields. The hardware units 1005-1030 overlap as much of the HMAC and encryption as possible.

Operation is similar for a copy operation, but software 204 may split the source data across multiple control words. In at least one embodiment the destination buffer is contiguous. For an inbound packet, software 204 provides the crypto co-processor 250 with the address of the packet, cipher and authentication algorithm, keys, and initialization vectors. For in-place decryption, hardware units 1005-1030 will decrypt the data, MAC, and padding fields, then authenticate the packet. Since the MAC is encrypted and performed on the cleartext data, authentication may be required to wait for the decryption to complete. The hardware units 1005-1030 will overlap as much of the decryption and authentication as possible. Operations are similar for a copy decryption/authentication.

XML encryption or XML signature does not require any special support for XML features. The encryption and authentication algorithms can be accessed directly via the control word queue 210 and/or the interface 215. The following are examples of XML encryption/signature algorithms that can be supported:

SHA-1 (XML Signature, XML Encryption)
SHA-256 (XML Encryption)
Triple DES (XML Encryption)
AES-128 (XML Encryption)
AES-192 (XML Encryption)
AES-256 (XML Encryption)

The crypto co processor 250 can also support MPA framing and de-framing. The first byte of the source data must point to the first byte of the ULPDU (outbound data) or FPDU (inbound data). For outbound ULPDUs, the crypto hardware units 1005-1030 will support the following operations:

Given the starting byte offset into the ULPDU of the first marker position and the initial marker value, insert 4B markers into the ULPDU.

Based upon the ULPDU length, insert 0-3 bytes of padding as necessary.

Calculate the CRC32c.

Create the new FPDU. This may entail a copy operation or it may be done in-place. For an in-place operation, software 204 must have allowed sufficient room for padding, the markers, and the CRC.

For inbound FPDUs, the crypto hardware units 1005-1030 will support the following operations:

Calculate and validate the CRC32c. The crypto hardware portions 1005-1030 will signal an error if there is a CRC mismatch. Given the initial position of the marker relative to the start of the FPDU, validate that all markers contained in the FPDU have appropriate values. The crypto hardware units 1005-1030 will examine the FPDU length and remove padding bytes as necessary. After removing the markers, padding, and CRC from the FPDU to form the ULPDU, the crypto hardware units 1005-1030 will copy the ULPDU to the destination.

The crypto hardware units 1005-1030 can also support calculation and validation of the TCP or UDP payload and IPv4 header checksums. The crypto hardware units 1005-1030 can either perform just the IPv4 header checksum calculation or the TCP/UDP payload checksum in addition to the IPv4 header checksum. For an outbound IP datagram, hardware will be programmed with the initial byte of the IP header. For IPv4, the crypto hardware units 1005-1030 will parse the header and process options, to locate the start of the TCP or UDP header. The crypto hardware units 1005-1030 will parse the TCP or UDP header to determine the starting point and length of the TCP or UDP payload. Using the pseudo-header, the crypto hardware units 1005-1030 will then calculate the TCP/UDP checksum and place the result in memory at the destination address. The crypto hardware units 1005-1030 will then compute the IP header checksum.

For an inbound IP datagram, the crypto hardware units 1005-1030 can also support calculation and validation of the TCP/UDP payload and IPv4 header checksums independently. Again, crypto hardware units 1005-1030 will support parsing of IPv4/v6 and TCP headers with options.

The crypto hardware units 1005-1030 can also perform the IPv4 header checksum, TCP/UDP payload checksum, and MPA FPDU framing operation in a one-pass operation. For an outbound datagram containing an MPA ULPDU, crypto hardware units 1005-1030 will parse the IP, TCP, and ULPDU header and add padding bytes, markers, and CRC32c, before calculating the TCP/UDP payload checksum and IP header checksum. For an inbound datagram containing an MPA FPDU, crypto hardware units 1005-1030 will validate both the IP header checksum, and the TCU/UDP payload checksum, before validating the MPA CRC32c, validating the markers, and finally removing the CRC32c, markers, and padding bytes. The crypto hardware units 1005-1030 typically will not alter the IP payload length field or adjust TCP sequence numbers as these fields are typically precalculated or post-calculated by software 204.

The crypto co-processor 250 can also support SSL/TLS session key generation. For SSL. The crypto co-processor 250 will support the following operations:

Software 204 will provide crypto hardware units 1005-1030 with the starting byte address of the source data, which will consist of the 48-byte pre-master secret, followed by the 32-byte ClientHello.random and the 32-byte ServerHello.random data. The crypto hardware units 1005-1030 can then compute the 48-byte master secret and place it in the destination, according to the following formula:

MD5(pre_master_secret$\|$SHA-1
  ('$A$'$\|$pre_master_secret$\|$ClientHello.random$\|$ServerHello.andom))$\|$ MD5(pre_master_secret$\|$SHA-1
  ('$BB$'$\|$pre_master_secret$\|$ClientHello.random$\|$ServerHello.random))$\|$ MD5(pre_master_secret$\|$SHA-1
  ('$CCC$'$\|$pre_master_secret$\|$ClientHello.random$\|$ServerHello.random))

Software 204 will also provide crypto hardware units 1005-1030 with a length, in bytes, of the desired key block. The crypto hardware units 1005-1030 can also iterate using the following formula until enough output has been produced:

MD5(master_secret$\|$SHA-1
  ('$A$'$\|$master_secret$\|$ServerHello.random$\|$ClientHello.random))$\|$ MD5(master_secret$\|$SHA-1
  ('$BB$'$\|$master_secret$\|$ServerHello.random$\|$ClientHello.random))$\|$ MD5(master_secret$\|$SHA-1
  ('$CCC$'$\|$master_secret$\|$ServerHello.random$\|$ClientHello.random))$\|$ The second operation may be chained with or performed separately from the first operation. If chained, the crypto hardware units 1005-1030 will concatenate the master secret with the key block.

For TLS, the crypto hardware units 1005-1030 can compute the master secret and key block. In order to compute the master secret, software 204 provides the crypto hardware units 1005-1030 with the pre-master secret and Server and Client random values as for SSL. The crypto hardware units 1005-1030 computes the master secret as follows until enough output (in this case, 48 bytes) have been produced:

PRF(pre_master_secret,"master secret",
  ClientHello.random$\|$ServerHello.random)

where the PRF is defined as:

P_MD5(pre_master_secret[47:24],
  "master_secret"$\|$ClientHello.random$\|$ServerHello.random)XOR P_SHA-1(pre_master_secret[23:0],
  "master_secret"$\|$ClientHello.random$\|$ServerHello.random)
  with P_MD5/P_SHA-1 defined as:

$H(0)$=HMAC_MD5/SHA-1(secret, seed)

$H(i)$=HMAC_MD5/SHA-1(secret, $H(i-1)\|$seed)

The software 204 may also have the crypto hardware units 1005-1030 compute the TLS key block by providing hardware the source address of the master secret, the server random value, client random value, and the desired length of the key block. The crypto hardware units 1005-1030 will iterate over the PRF using the following formula until enough output has been produced:

PRF(master_secret, "key expansion",
  SecurityParameters.server_random$\|$SecurityParameters.client_random)

The second operation may be chained to the first. In this case, software 204 must store the pre-master secret and random values at the source location As used herein in connection with the description of the invention, the term "about" means +/−10%. By way of example, the phrase "about 250" indicates a range of between 225 and 275. With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data that can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

It will be further appreciated that the instructions represented by the operations in FIG. 3 are not required to be performed in the order illustrated, and that all the processing represented by the operations may not be necessary to practice the invention. Further, the processes described in FIG. 3 can also be implemented in software stored in any one of or combinations of the RAM, the ROM, or the hard disk drive.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method of processing a cryptographic packet comprising:
   receiving a first cryptographic packet in a network interface included in a host CPU, wherein receiving the first cryptographic packet includes determining the first cryptographic packet is encrypted;
   identifying a first set of data required to execute the first cryptographic packet;
   transferring the first cryptographic packet and the required first set of data to a cryptographic co-processor including transferring the first cryptographic packet and the required first set of data through a control queue, identifying a storage location of the cryptographic packet in a control word stored in the control queue, wherein at least a portion of the control queue is maintained in at least one hardware register, wherein the cryptographic co-processor and the host CPU are on the same die and wherein the cryptographic co-processor and the host CPU share access to the control queue and wherein the cryptographic co-processor and the host CPU share a single arithmetic unit and at least one memory access unit, wherein the single shared arithmetic unit is included in the cryptographic co-processor and wherein the at least one memory access unit is included in the host CPU, wherein identifying the first set of data required to execute the first cryptographic packet includes identifying the required first set of data in a first control word and wherein the first control word is located in the control queue;
   executing the first cryptographic packet in the cryptographic co-processor;
   notifying the host CPU that the execution of the first cryptographic packet is complete including updating the control word in the control queue; and
   receiving the executed first cryptographic packet in the host CPU.

2. The method of claim 1, wherein the control word includes instructions for the crypto co-processor.

3. The method of claim 1, wherein the first control word identifies a first storage location of the first cryptographic packet and a second storage location of the required first set of data.

4. The method of claim 1, wherein notifying the host CPU that the execution of the first cryptographic packet is complete includes modifying a field in the first control word.

5. The method of claim 4, wherein modifying the field in the first control word includes identifying a third location of an execution result of the executed first cryptographic packet.

6. The method of claim 5, wherein receiving the executed first cryptographic packet in the host CPU includes the host CPU retrieving the execution result from the third location identified by the first control word.

7. The method of claim 1, wherein transferring the first cryptographic packet and the required first set of data to the cryptographic co-processor includes:
   receiving a subsequent packet in the host CPU; and
   executing the subsequent packet in the host CPU.

8. The method of claim 7, wherein the subsequent packet is a second cryptographic packet and executing the subsequent packet in the host CPU includes:
   identifying a second set of data required to execute the second cryptographic packet;
   transferring the second cryptographic packet and the required second set of data to the cryptographic co-processor;
   executing the second cryptographic packet in the cryptographic co-processor;
   notifying the host CPU that the execution of the second cryptographic packet is complete; and
   receiving the executed second cryptographic packet in the host CPU.

9. The method of claim 8, wherein the second cryptographic packet is executed in the cryptographic co-processor substantially in parallel with executing the first cryptographic packet.

10. The method of claim 8, wherein the second cryptographic packet is executed in the cryptographic co-processor in series with executing the first cryptographic packet.

11. The method of claim 7, wherein the subsequent packet is a second cryptographic packet and executing the subsequent packet in the host CPU includes:
   identifying a second set of data required to execute the second cryptographic packet;
   transferring the second cryptographic packet and the required second set of data to the cryptographic co-processor via an interface;
   executing the second cryptographic packet in the cryptographic co-processor substantially in parallel with executing the first cryptographic packet;
   notifying the host CPU that the execution of the second cryptographic packet is complete; and
   receiving the executed second cryptographic packet in the host CPU.

12. The method of claim 1, wherein notifying the host CPU that the execution of the first cryptographic packet is complete includes sending an interrupt request to the CPU.

13. A microprocessor comprising:
a host CPU;
a cryptographic co-processor;
a control queue coupled to the host CPU and the cryptographic co-processor wherein at least a portion of the control queue is maintained in at least one hardware register, wherein the control queue includes a control word stored and wherein the cryptographic co-processor and the host CPU share access to the control queue and wherein the cryptographic co-processor and the host CPU share a single arithmetic unit and at least one memory access unit, wherein the single shared arithmetic unit is included in the cryptographic co-processor and wherein the at least one memory access unit is included in the host CPU; and
computer readable code on a computer readable medium for transferring the first cryptographic packet and the required first set of data through the control queue and identifying the first set of data required to execute the first cryptographic packet including identifying the required first set of data in a first control word and wherein the first control word is located in the control queue.

14. The system of claim 13, wherein the cryptographic co-processor includes a plurality of hardware units.

15. The system of claim 14, wherein the plurality of hardware units includes one or more cryptographic units that are optimized to perform a selected encryption process.

16. The system of claim 13, wherein the control queue is a storage location in the microprocessor.

17. The system of claim 13 further comprising an interface coupled between the host CPU and the cryptographic co-processor.

18. The system of claim 17, wherein the interface is capable of transferring an instruction from the host CPU to the cryptographic co-processor.

19. The system of claim 17, wherein the interface includes a plurality of hardware registers.

\* \* \* \* \*